United States Patent [19]
Koch

[11] Patent Number: 5,538,115
[45] Date of Patent: Jul. 23, 1996

[54] MOTOR DRIVEN ROTATIONAL TO TRANSLATIONAL ACTUATOR FOR A PISTON CYLINDER

[75] Inventor: Klaus Koch, Dahlheim, Germany

[73] Assignee: Stabilus GmbH, Koblenz, Germany

[21] Appl. No.: 224,014

[22] Filed: Apr. 6, 1994

[30] Foreign Application Priority Data

Apr. 8, 1993 [DE] Germany .......................... 43 11 625.6

[51] Int. Cl.$^6$ .............. F15B 15/26; A47G 3/20; B60N 2/44
[52] U.S. Cl. ......................................................... 188/299
[58] Field of Search ............................ 188/285, 299; 74/110

[56] References Cited

U.S. PATENT DOCUMENTS

| | | | |
|---|---|---|---|
| 4,771,655 | 9/1988 | Kawamura | 188/299 X |
| 4,834,088 | 5/1989 | Jeanson | 188/299 |
| 5,064,031 | 11/1991 | Kakizaki | 188/299 |
| 5,078,241 | 1/1992 | Ackermann et al. | 188/299 |
| 5,148,895 | 9/1992 | Kakizaki | 188/299 |
| 5,305,860 | 4/1994 | Rotharmel et al. | 188/299 |

FOREIGN PATENT DOCUMENTS

| | | |
|---|---|---|
| 3913849 | 10/1990 | Germany . |
| 3934960 | 4/1991 | Germany . |

*Primary Examiner*—Josie A. Ballato
*Attorney, Agent, or Firm*—Nils H. Ljungman

[57] ABSTRACT

Pneumatic, hydraulic or hydropneumatic adjustment device with a tubular container under pressure, which is divided into two work chambers by a piston fastened to a piston rod, whereby there is a locking device which can be tripped by a tripping tappet which runs lengthwise through the piston rod and extends outward. The tripping tappet is actuated by way of a motor, whereby there is an axially movable tripping element between the drive shaft of the motor and the tripping tappet.

12 Claims, 16 Drawing Sheets

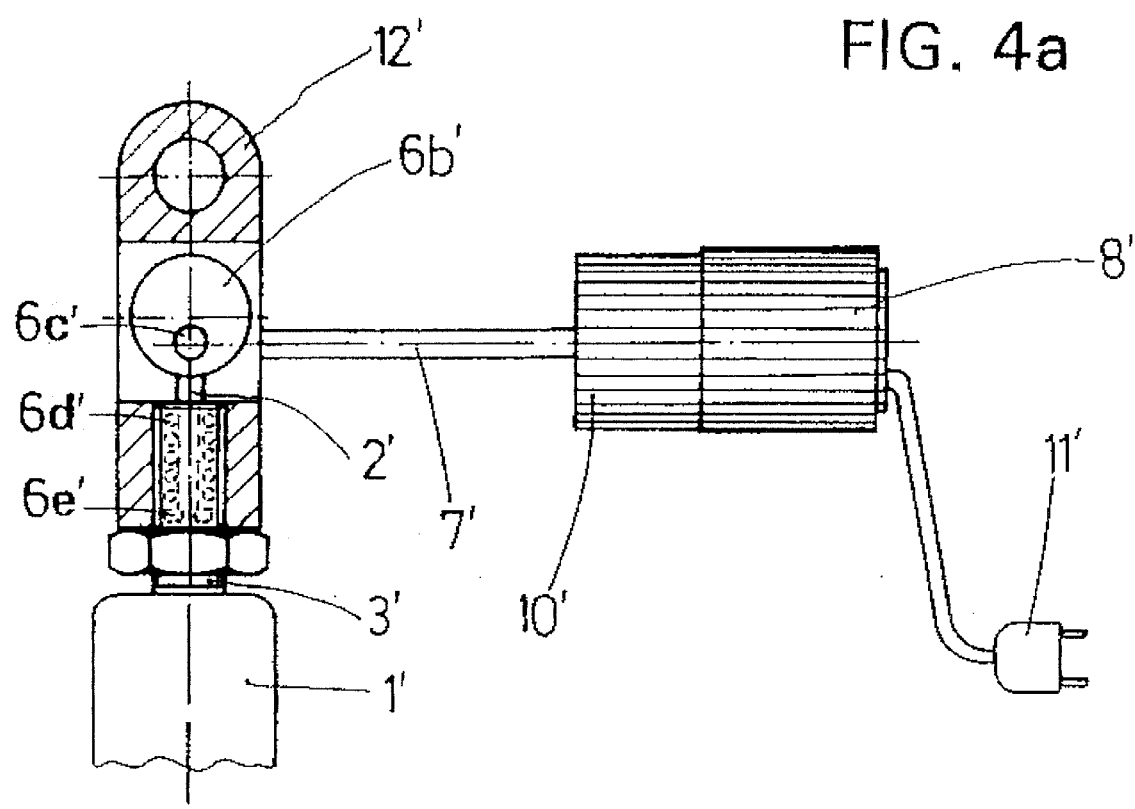

5,538,115

MOTOR DRIVEN ROTATIONAL TO TRANSLATIONAL ACTUATOR FOR A PISTON CYLINDER

BACKGROUND OF THE INVENTION

1. Field of the Invention

The present invention generally relates to a pneumatic, hydraulic or hydropneumatic adjustment device with a tubular vessel under pressure. The tubular vessel is divided into two work chambers by a piston fastened to a piston rod, whereby there is a blocking device which can be activated by a tripping tappet or actuating device which runs longitudinally in the piston rod and is guided outward.

2. Background Information

Tripping devices of pneumatic, hydropneumatic or hydraulic adjustment and locking elements, or possibly detent elements, are used, for example, in locking gas pressure springs to adjust the height of the seats and backrests on chairs, or headrests and footrests on beds, or as hydraulic locking elements for the steering column adjustments of motor vehicles. The tripping devices used in those cases are mechanical tripping devices. The activation of the mechanical tripping devices takes place either directly on the tripping device, or by means of an activation element separate from the tripping device, in which the activation force is transmitted by a system of levers and/or by a Bowden cable.

Such tripping devices may be disclosed in German Laid Open Patent Appln. No. 3 934 960 and German Laid Open Patent Appln. No. 3 913 849. Hydraulic translations, as disclosed in German Laid Open Patent Appln. No. 3 934 960, or the addition of electrical energy, as disclosed in German Laid Open Patent Appln. No. 3 913 849, make it possible to reduce the activation forces and distances to a minimum.

On such mechanical tripping devices, one disadvantage is that the required activation force and/or the activation distance can be quite large, depending on the realization in question. An additional disadvantage is that with the mechanical tripping devices, there may not be an excessive distance between the activation mechanism and the tripping device, because an increasing distance results in a reduction of the efficiency of the mechanism.

That in turn necessitates an increase in the activation force. An additional disadvantage with continuous tripping (unlocking of the adjustment mechanism) on hydraulic and mechanical tripping systems is that a force must be applied permanently, and with electrical tripping systems, electrical energy must be added constantly.

OBJECT OF THE INVENTION

The object of the invention is to create a locking device for an adjustment device, in which, after the activation of the tripping tappet or actuation device, it is also possible to continuously trip the locking apparatus, preferably without the further addition of energy.

SUMMARY OF THE INVENTION

The invention teaches that this object can be achieved preferably by a tripping tappet which is operated by means of a motor, whereby there is a tripping element located between the drive shaft of the engine or motor and the tripping tappet.

It is thereby advantageous if, after the engine has been turned on, the rotational movement of the drive shaft of the engine can preferably be converted into a translation movement by the threaded spindle. As the result of a sufficient automatic interlocking of the thread of the threaded spindle, a permanent tripping (unlocking) of the adjustment device can be achieved without the further input of energy.

The invention also teaches that the motor can preferably be an electric motor.

In an additional favorable embodiment, the tripping element can preferably be a threaded spindle. The drive shaft and the threaded spindle can thereby be connected to one another so that they are essentially torsionally stationary in relation to one another.

To achieve the axial movement of the threaded spindle, the invention also teaches that the threaded spindle can preferably be located by means of a screw thread in a housing. One advantage of this configuration is that the threaded spindle can execute the rotational movement of the drive shaft in an axial movement, preferably with the help of the screw thread.

In an additional configuration, the threaded spindle can preferably be actuated by a transmission, whereby the transmission can advantageously be comprised of at least two gear wheels preferably between the threaded spindle and the drive shaft.

An additional essential feature of the invention is that the tripping element can preferably be designed as a cam, so that during the rotation by the drive shaft, an axial distance can be travelled toward the tripping tappet.

In an additional favorable embodiment, there can preferably be a lever between the tripping pin and the threaded spindle. An advantage of this configuration is that the tripping device and the adjustment device can preferably be oriented axially parallel to one another, so that the axial movement of the threaded spindle can be converted by the lever into an axial movement of the tripping tappet.

In one favorable variant, the force of the lever in either direction can be assisted if the lever is actuated by a spring in at least one direction of movement.

To integrate the adjustment device, together with the tripping device, into a complete electrical system, the invention teaches that, in an additional configuration, the motor can preferably be controlled by means of a suitable electronic system.

One aspect of the invention resides broadly in an adjustment device comprising: a tubular body; a piston disposed within the body; the piston dividing the body into a first chamber and a second chamber; fluid under pressure being disposed in the first chamber and the second chamber; a piston rod connected to the piston; the piston rod having a longitudinal dimension; the piston rod having a longitudinal bore extending along the longitudinal dimension within the piston rod; restricting means disposed within the body for restricting at least one motion of said piston within the body; means for modifying the at least one motion restriction of the restricting means; the means for modifying comprising: an inner rod disposed within the longitudinal bore of the piston rod; motor means; and means for transferring motion from the motor means to the inner rod to move the inner rod along the longitudinal dimension of the piston rod to modify the at least one motion of the piston within the body.

Another aspect of the invention resides broadly in a method of operating an adjustment device, the adjustment device comprising: a tubular body; a piston disposed within the body; the piston dividing the body into a first chamber and a second chamber; fluid under pressure being disposed in the first chamber and the second chamber; a piston rod connected to the piston; the piston rod having a longitudinal dimension; the piston rod having a longitudinal bore extending along the longitudinal dimension within the piston rod; restricting means disposed within the body for restricting at least one motion of the piston within the body; means for modifying the at least one motion restriction of the restricting means; the means for modifying comprising: an inner rod disposed within the longitudinal bore of the piston rod; motor means; and means for transferring motion from the motor means to the inner rod to move the inner rod along the longitudinal dimension of the piston rod to modify the at least one motion of the piston within the body; the method comprising the steps of: providing a tubular body; providing a piston; disposing the piston within the body; dividing the body into a first chamber and a second chamber by means of the piston; disposing fluid under pressure in the first chamber and the second chamber; providing a piston rod; connecting the piston rod to the piston, the piston rod having a longitudinal dimension and a longitudinal bore extending along the longitudinal dimension within the piston rod; providing restricting means; disposing the restricting means within the body; restricting at least one motion of the piston within the body by means of the location restricting means; providing means for modifying the at least one motion restriction of the restricting means; the providing of the means for modifying comprising: providing an inner rod; disposing the inner rod within the longitudinal bore of the piston rod; providing motor means; providing means for transferring motion from the motor means to the inner rod to move the inner rod along the longitudinal dimension of the piston rod to modify the at least one motion of the piston within the body; and moving the inner rod along the longitudinal dimension to modify flow characteristics between the first and second chamber.

BRIEF DESCRIPTION OF THE DRAWINGS

Preferred embodiments of the invention are schematically illustrated in the accompanying drawings, in which:

FIG. 4a shows substantially the same view as FIG. 4, but shows additional components;

FIGS. 11–17 illustrate additional, related embodiments of the present invention, wherein:

FIG. 11 shows a shock absorber with an adjustable damping force, together with a drive device, in cross section;

FIG. 12 shows an axially-parallel orientation of the shock absorber and the drive device, in partial cross section;

FIG. 13 shows an orientation of the drive device and the shock absorber, with the interposition of a transmission, in partial cross section;

FIG. 14 shows an orientation of a drive device and a shock absorber in which the drive shaft of the motor is connected by means of a cam to the control rod of the shock absorber;

FIG. 15 shows a simple manual drive device; and FIGS. 16 and 17 show types of vibration dampers which may incorporate the embodiments of the present invention.

DESCRIPTION OF THE PREFERRED EMBODIMENTS

Figure 1:
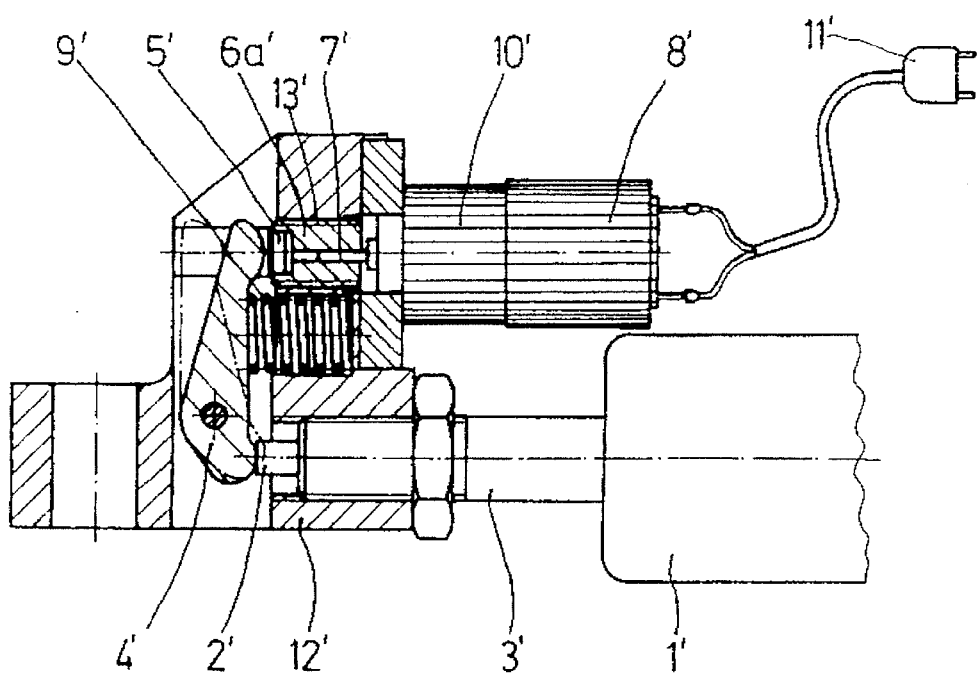
FIG. 1 shows an axially parallel orientation of the motor and the adjustment element, partly in a plan view and partly in cross section.

FIG. 1 shows an adjustment device 1', the operation of which can be pneumatic, hydraulic or hydropneumatic. A piston rod 3' can preferably exit axially from a pressurized tubular container. Inside the piston rod 3', a tripping tappet 2' can preferably be used to trip a locking device, which locking device is discussed in further detail hereinbelow with reference to FIG. 6a, which locking device can preferably be located inside the adjustment device 1'.

The piston rod 3' can preferably be connected to a housing 12', whereby the housing 12' can also preferably contain a motor 8'. The motor 8' is preferably oriented so that a threaded spindle 6a' is driven by a drive shaft 7' of the motor 8'. The drive shaft 7' and the threaded spindle 6a' are preferably connected so that they are essentially torsionally stationary in relation to one another, but the drive shaft 7' is preferably located so that it can move axially in a hole in the threaded spindle 6a', so that the threaded spindle 6a' can execute an axial movement preferably by means of an external thread 13' of the threaded spindle 6a'. The threaded spindle 6a' can thus preferably form a screw thread transmission with the housing 12', which housing 12' can preferably have an internal thread 12b' (see FIG. 1a), in which the rotational movement of the motor 8' can preferably be converted into a translational movement by means of the thread 13'.

In the embodiment illustrated in FIG. 1, the axial movement of the threaded spindle 6a' is preferably transmitted by means of a thrust washer 5' to a lever 4', and applied to the tripping tappet 2' preferably by means of the pivoting of the lever 4'. After the tripping force of the tripping tappet 2' is overcome, the tripping tappet 2' is preferably displaced axially, so that the adjustment device 1' can preferably be unlocked. For an essentially permanent tripping (unlocking) of the adjustment device 1' without the input of electrical energy, it is highly desirable for the screw thread transmission, which is preferably comprised of the threaded spindle 6a', the housing 12' and the screw thread 13', to have a sufficient automatic self-locking action. There can preferably be a spring 9', to provide additional force.

When a reverse current is applied to the motor 8', as a result of the tripping force, the tripping tappet 2' can preferably push the lever 4' back into the starting position of the lever 4', and preferably locks the adjustment device 1'. Any desired type of transmission 10' can be interposed between the motor 8' and the drive shaft 7'. The electrical current can be provided by way of the plug 11'.

Figure 1A:
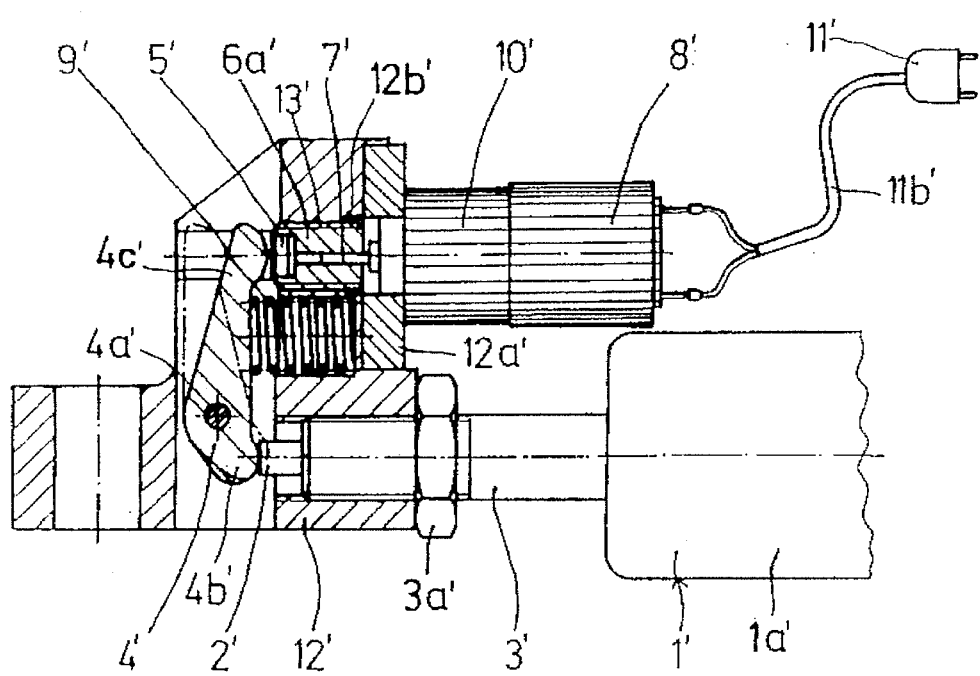
FIG. 1a shows substantially the same view as FIG. 1, but shows additional components.

With reference now to FIG. 1a, and as a further explanation of the above, in one embodiment the spring 9' may be a tension spring 9', which may bias a portion 4c' of lever 4' in a clockwise direction, preferably towards spindle 6a'. Tension spring 9' may be connected to housing 12a' and to portion 4c' in ways well known to a person having ordinary skill in the art.

Alternatively, according to an additional embodiment, portion 4c' may have a portion that engages with spindle 6a', such that as spindle 6a' retracts in a clockwise direction, spindle 6a' also pulls portion 4c' in a clockwise direction, thus preferably moving an additional portion 4b' in a counterclockwise direction.

Alternatively, according to yet an additional embodiment, the pressure exerted by tripping tappet 2' may be sufficient such that a compressional spring 9' could possibly be employed. In this case there would be no need for a connection between portion 4c' and spindle 6a' in order to pull portion 4c' in a clockwise direction towards spindle 6a', and thus portion 4c' would eventually make contact with spindle 6a or thrust washer 5'. When the spindle 6a' then exerts a force against portion 4c', thus moving portion 4c' in a counterclockwise direction, portion 4b' would then preferably exert a force on tripping tappet 2'.

According to the preferred embodiment, because the fluid within the adjustment device 1' is preferably under pressure, in many embodiments, the pressure of the tripping tappet 2' against portion 4b' should be sufficient to bias portion 4c' against the spindle 6a'.

In an alternative embodiment of the present invention in which the pressure of tripping tappet 2' against portion 4b' would not be sufficient, then a connection between the spindle 6a' and portion 4c' of the lever 4' may be required which connection may be accomplished by a ball and socket arrangement. Spindle 6a' may be configured to have a ball at the end facing portion 4c'. Portion 4c' may then be configured to receive the ball of spindle 6a'. Further, portion 4b' and the end of tripping tappet 2' may be configured in a similar manner.

Alternatively, spindle 6a' may be configured to receive a ball located on portion 4c'. Portion 4b' and the end of the tripping tappet 2' facing portion 4b' may be configured in a similar manner.

Preferably, with further reference to FIG. 1a, adjustment device 1' may include a typical piston-cylinder arrangement within pressurized tubular container 1a'. As such, there may preferably be a piston attached at the end of piston rod 3' within pressurized tubular container 1a', wherein the piston would divide the interior of pressurized tubular container 1a' into upper and lower work chambers. Such upper and lower work chambers may preferably be connected by one or more passages, any or all of which may be selectively openable and closable by means of tripping tappet 2'. Thus, a "locking device", as employed by the present invention, may conceivably be constituted by the interaction of tripping tappet 2' with a flow passage interconnecting the upper and lower work chambers just described, wherein, in a "locked" configuration, the tripping tappet 2' would essentially block the aforementioned flow passage, and in an "unlocked" configuration, the control rod would permit flow between the upper and lower work chambers. In the case of a piston-cylinder arrangement, as just described, the tripping tappet 2' could also conceivably serve to vary damping of the piston-cylinder arrangement, rather than just provide a "locked" state or an "unlocked" state. Further, the tripping tappet 2' may be connected with another type of mechanism which would provide a "locked" or "unlocked" state.

Conceivably, the piston-cylinder arrangement just described may be similar to that illustrated below with reference to FIG. 11 and 11a.

FIG. 1a illustrates fulcrum 4a', about which lever 4' can preferably pivot. Fulcrum 4a' may preferably be embodied by a pivot pin or the like. Further, portions 4b' and 4c' of the lever 4' can preferably have a length ratio of about 1:3 from the fulcrum 4a' to the end of each portion 4b' and 4c'. FIG. 1a also illustrates electrical connections 11b', which can preferably provide electrical power to motor 8'.

Additionally, in accordance with a preferred embodiment of the present invention, threaded spindle 6a' is preferably configured, by means of its external screw thread 13', to displace axially in response to the rotational driving force provided by motor 8', and thus provide a pivoting force on lever 4' to push tripping tappet 2' axially in a closing direction. Spring 9' may preferably be provided to essentially provide a biasing force on lever 4' in the pivoting direction corresponding to the closing direction of tripping tappet 2', such that the biasing may preferably provide a power assist for the action of spindle 6a' on lever 4'. Transmission 10' may preferably be configured to ensure that spindle 6a' rotates at an appropriate rotational velocity in response to the rotational movement of motor 8'. Such transmissions are generally well-known to those of ordinary skill in the art and will not be further described here.

To enable axial displacement of threaded spindle 6a', according to the preferred embodiment, the drive shaft 7' can preferably be provided with a slot along the exterior surface of the drive shaft 7'. The slot can preferably extend along the entire axial length of the drive shaft 7', or along only a portion of the drive shaft 7'. The spindle 6a' can then preferably be provided with a key or projection which key can then fit into the slot of the drive shaft 7', in order to provide a torsionally stationary relationship between the spindle 6a' and the drive shaft 7', while allowing the spindle 6a' and the drive shaft 7' to preferably move axially with respect to one another.

Alternatively, to enable axial displacement of threaded spindle 6a', the drive shaft 7' may be provided with an external thread to engage with an internal thread of threaded spindle 6a', whereby rotation of drive shaft 7' would essentially translate directly into axial displacement of threaded spindle 6a'. In such an instance, external threads may or may not be needed on spindle 6a'. Of course, it should be understood that any appropriate means may be employed, within the scope of the present invention, to convert a rotational displacement of drive shaft 7' into pivoting displacement of lever 4'.

Types of adjustment devices which may be utilized in accordance with the present invention may include, for example, devices to adjust the height of seats and backrests on chairs, devices to adjust the height of headrests and footrests on beds, and hydraulic locking elements for adjusting the position of a steering column of a motor vehicle. These types of adjustment devices are listed only as non-restricting examples, and it should be understood that other similar types of adjustment devices may also be utilized in accordance with the embodiments of the present invention.

Figure 2:
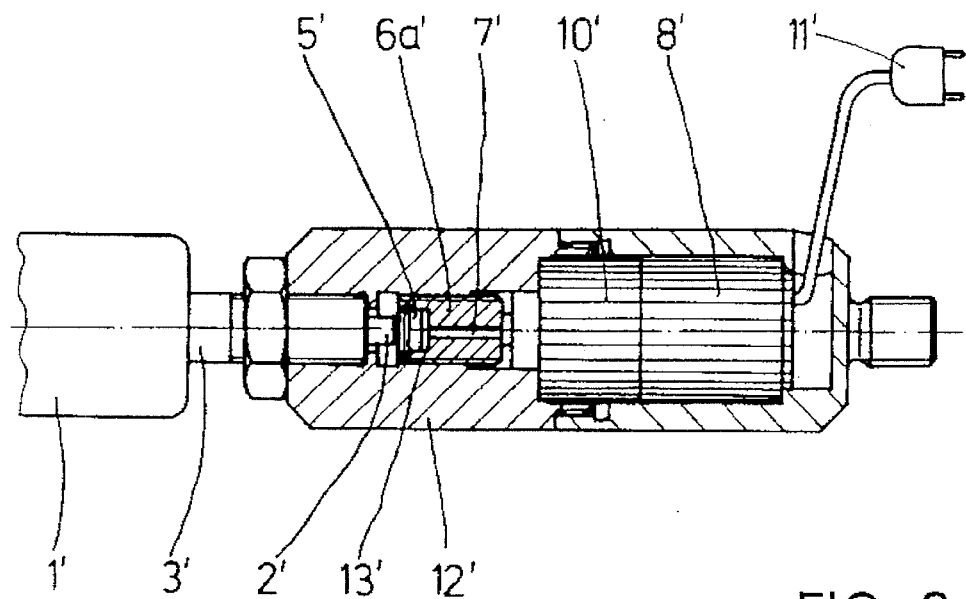
FIG. 2 shows an axial arrangement of the motor and adjustment element.

FIG. 2 shows an axial orientation of the adjustment device 1' and the motor 8'. Theoretically, this is a realization similar to the one illustrated in FIG. 1, whereby the rotational movement of the drive shaft 7' is preferably transmitted directly to the threaded spindle 6a' and is converted into a translation movement by means of the screw thread 13'. In this embodiment, too, there is preferably a thrust washer 5' located between the tripping tappet 2' and the threaded spindle 6a'. Thus, whereas, in the arrangement illustrated in FIG. 1, thrust washer 5' interacts with lever 4', which then interacts with tripping tappet 2', it will be noted that, in the arrangement illustrated in FIG. 2, thrust washer 5' can preferably interact essentially directly with tripping tappet 2'.

Figure 3:
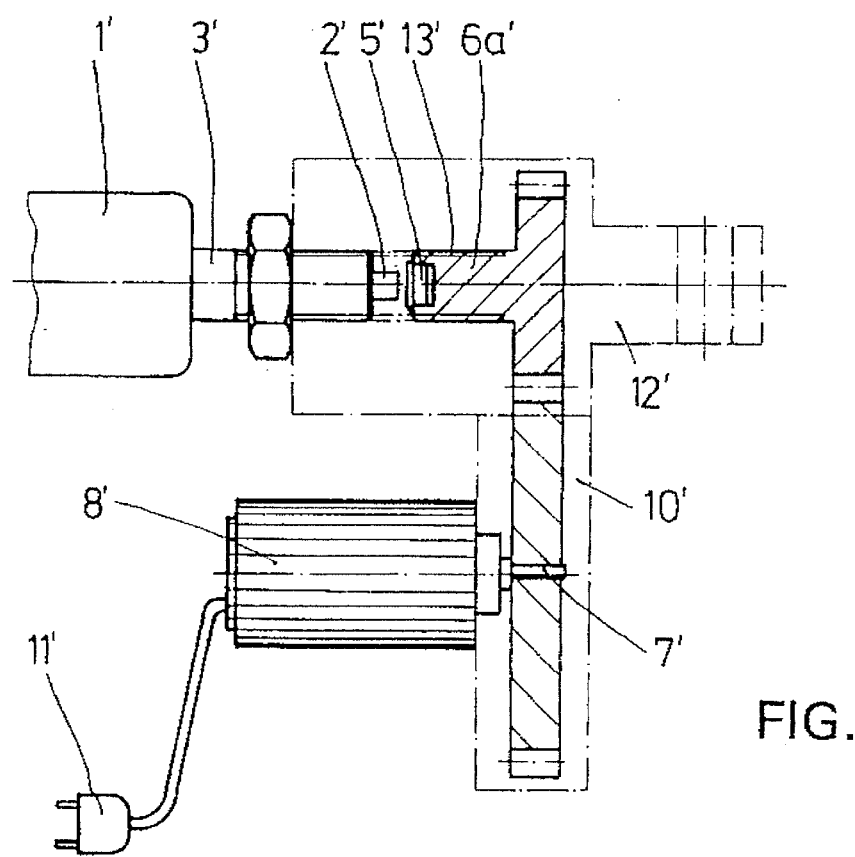
FIG. 3 shows an arrangement of the motor and adjustment element, with the interposition of a transmission.

FIG. 3 shows an additional axially parallel orientation of the motor 8' and the adjustment device 1', whereby in contrast to FIG. 1, there is not a lever 4', but, instead, a gear wheel transmission 10' to transmit the rotational movement of the drive shaft 7' to the threaded spindle 6a'. As a result of the rotational movement of the drive shaft 7' preferably by means of the two gear wheels, an axial movement of the threaded spindle 6a' can result, preferably by means of the screw thread 13'.

Figure 3A:
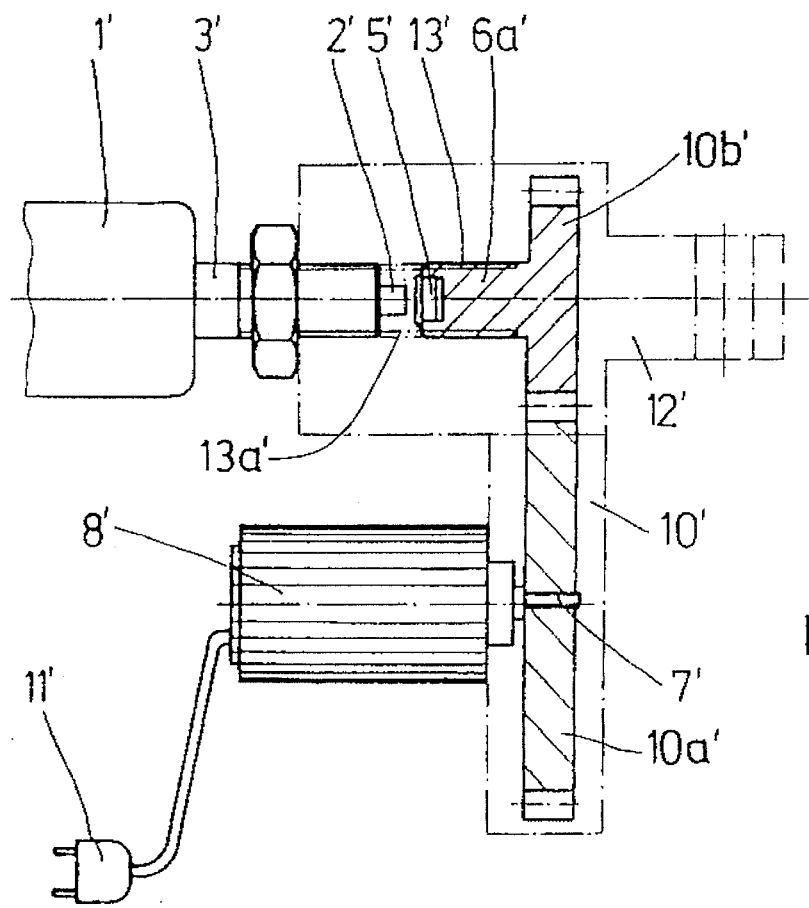
FIG. 3a shows substantially the same view as FIG. 3, but shows additional components.

Thus, in accordance with a preferred embodiment of the present invention, as shown in FIG. 3a, a gear wheel transmission 10' may preferably be provided to transmit the rotation of the drive shaft 7' to the threaded spindle 6a'. In this respect, gear wheel transmission 10' may preferably include two gear wheels 10a' and 10b', the former being associated with drive shaft 7' and the latter being associated with spindle 6a'. In one embodiment of the present invention, the spindle 6a' may be integral with gearwheel 10b'. Upon rotation of spindle 6a' and gearwheel 10b', an annular member 13a', generally in the form of a hollow cylinder, and provided with external threads to engage with internal threads on housing 12', and also provided with internal threads to engage with external threads on spindle 6a', may displace axially to effect axial displacement of tripping tappet 2'. As such, annular member 13a' may be directly connected with tripping tappet 2'. With regard to the annular member 13a', in order to provide a locus for contacting and axially displacing tripping tappet 2', there may preferably be a disc member disposed across the annular member 13a' at that end portion of annular member 13a' which faces tripping tappet 2'. In accordance with a preferred embodiment of the present invention, this disc member may be directly connected to tripping tappet 2' so that tripping tappet 2' could displace both rotatingly and axially in concert with annular member 13a'. Alternatively, the disc member and the tripping tappet could conceivably be disconnected with respect to one another, in which case the fluid pressure present within adjustment device 1' may be sufficient to afford retraction of tripping tappet 2' back towards gearwheel 10b' upon retraction of gearwheel 10b' away from tripping tappet 2'.

In a further alternative embodiment of the present invention, thrust washer 5' may essentially provide a recess for the receipt of an end portion of tripping tappet 2' therewithin. External threading on the end portion of tripping tappet 2' could conceivably engage with internal threading on the recess, wherein such external threading and internal threading would be configured such that, upon rotation of gearwheel 10b', the tripping tappet 2' would displace axially.

In a further alternative embodiment of the present invention, gearwheel 10b' could have a sufficient axial dimension to allow for axial displacement of gearwheel 10b' during the transfer of a rotational driving force from gearwheel 10a' to gearwheel 10b'. This would conceivably be facilitated by external screw thread 13' on threaded spindle 6a', which threaded spindle 6a' would essentially be integral with gearwheel 10b'. Accordingly, there would preferably be internal threads on housing 12' to engage with external screw thread 13'.

Of course, other appropriate means for converting the rotational movement of gearwheel 10b' into an axial movement of tripping tappet 2' may be utilized within the scope of the present invention.

Figure 4:
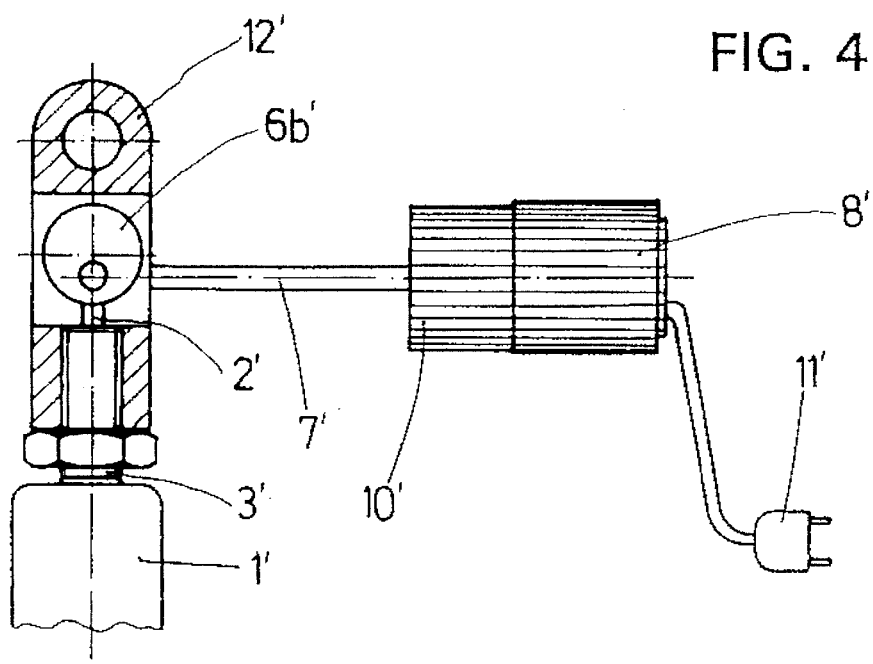
FIG. 4 shows an arrangement of an adjustment element in which the drive shaft of the motor activates a cam.

FIG. 4 shows the adjustment device 1' and its tripping tappet 2', which tripping tappet 2' can be directly actuated by a cam 6b'. The cam 6b' is preferably mounted eccentrically, and when rotated by the drive shaft 7', can preferably execute a corresponding axial movement to actuate the tripping tappet 2'.

Thus, in accordance with a preferred embodiment of the present invention, the rotation of drive shaft 7' may preferably be converted into the rotation of a cam 6b' to effect axial displacement of tripping tappet 2'. As shown in FIG. 4a, cam 6b' preferably has a locus of rotation 6c'. Drive shaft 7' may provide a direct, coaxial driving force to this locus of rotation 6c' or may, conceivably, provide the rotational driving force to locus of rotation 6c' through an intermediate gear arrangement (not shown), which gear arrangement may include bevel gears which change the motion of the drive shaft 7' by 90°. Such an intermediate gear arrangement, the nature of which will be readily apparent to those of ordinary skill in the art, may be employed, for example, when the drive shaft 7' is perpendicular to the rotational axis of cam 6b' or even disposed at another angle with respect thereto. In any of the examples just discussed with relation to FIG. 4a, the locus of rotation 6c' may preferably be integral with the cam 6b'.

In one preferred embodiment of the present invention according to FIG. 4a, the cam 6b' and tripping tappet 2' may preferably be disconnected with respect to one another. A biasing arrangement, including possibly a spring 6d' and a mounting surface 6e' for mounting one end of such a spring 6d', may be provided to bias tripping tappet 2' towards cam 6b'. Thus, upon rotational displacement of cam 6b' away from the position illustrated in FIG. 4a, the tripping tappet 2' will preferably be displaced downwardly until that portion of cam 6b' having a maximum radius is in contact with the end of tripping tappet 2'. Similarly, upon rotational displacement of cam 6b' away from the position of maximum downward displacement of tripping tappet 2', the biasing of tripping tappet 2' would essentially ensure retraction of tripping tappet 2' away from the maximum downward position. Alternatively, spring 6d' may not be needed if the pressure in the adjustment device 1' is sufficiently high.

Figure 5:
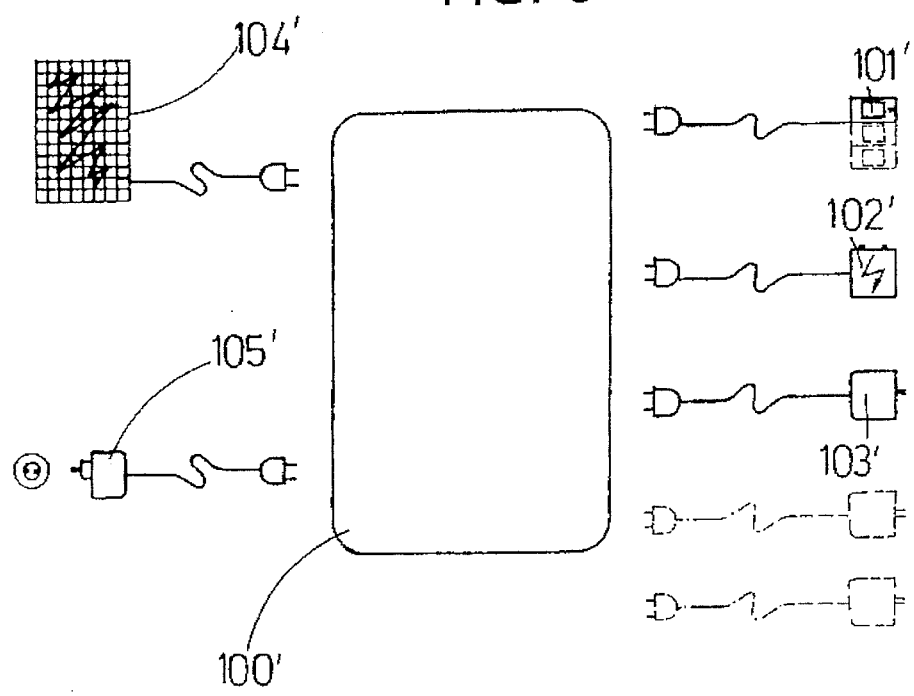
FIG. 5 shows a schematic illustration of a complete electrical system.

FIG. 5 illustrates the locking device 103' integrated essentially into a complete electrical system; this complete system is preferably comprised of an electronic control unit 100', a control keyboard 101' and a power source, such as a storage battery 102', a power supply 105' or a solar cell 104'. In this case, the adjustment device can preferably be easily actuated from a control keyboard 101'. The locking device 103' itself can be configured as illustrated in FIGS. 1–4a.

Figure 5A:
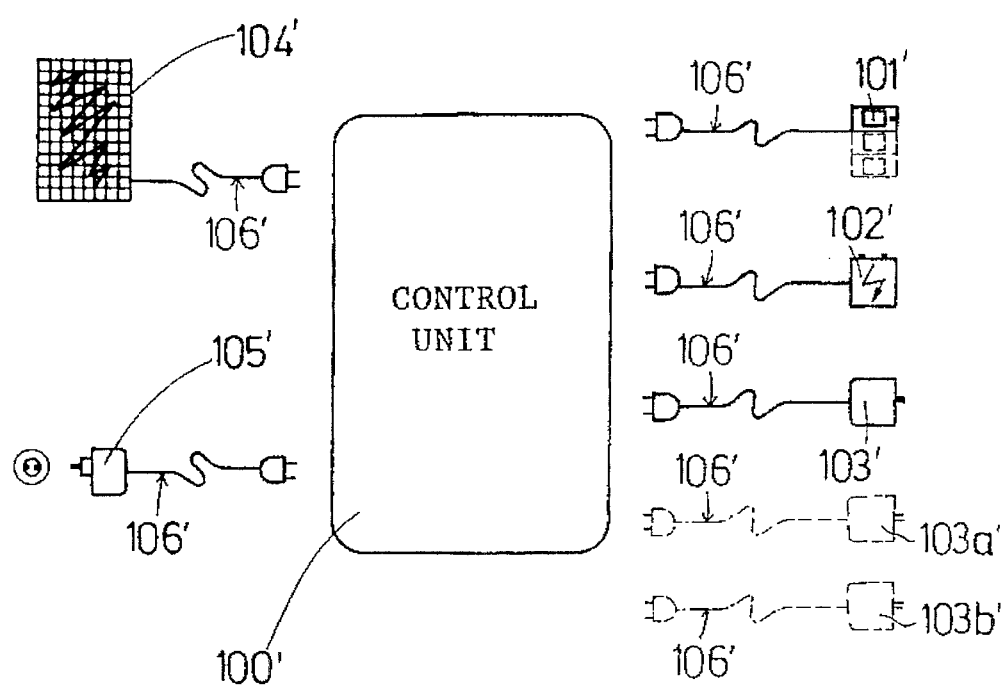
FIG. 5a shows substantially the same view as FIG. 5, but shows additional components.

Thus, essentially, in accordance with the preferred embodiment of the present invention, an integrated electrical system may preferably be provided to enable the control of a locking device 103' according to the present invention. Locking device 103' may essentially correspond to any of the complete operational ensembles shown in FIGS. 1–4a. Preferably, power may be provided by storage battery 102', by a power supply 105', such as an electrical power supply, or even by a solar cell 104', or even by any reasonable combination of these three types of power sources. Of course, other appropriate types of power sources may be utilized. As schematically illustrated in FIG. 5a, each of the power sources, as well as locking device 103', preferably includes an appropriate electrical connection, such as a wire and plug 106', to feed into control unit 100'.

Preferably, a control keyboard 101' may be provided to issue commands to the control unit 100'. Control keyboard 101' may also preferably include an appropriate electrical connection, such as a plug connection 106', for connection to the control unit 100'. Locking device 103' preferably receives commands from the control unit 100', based on the input provided to the control keyboard 101'. Thus, in accordance with the preferred embodiment of the present invention, an operator may conceivably input a command to open or close tripping tappet 2', if the tripping tappet 2' is positionable solely between an "open" and "closed" position, or may input any one of a range of values corresponding to a degree of opening or closing of tripping tappet 2'. As illustrated schematically in FIG. 5a, additional locking devices 103a' and 103b', and perhaps even more, may also be connected to control unit 100' for activation by control keyboard 101'. Conceivably, these additional locking devices, 103a' and 103b' may be actuable independently or interdependently with respect to each other, and/or to locking device 103'.

It will be appreciated that, with regard to the transmission 10' described hereinabove with reference to several embodiments of the present invention and illustrated in several drawings, the transmission 10' is preferably configured to downstep the rotational speed of motor 8' to a level more appropriate for effecting the relatively small rotational movements required for displacing tripping tappet 2' axially. Where no such transmission is described or illustrated with relation to a motor 8', it is to be understood that such a transmission could still be included, if appropriate.

Figure 6:
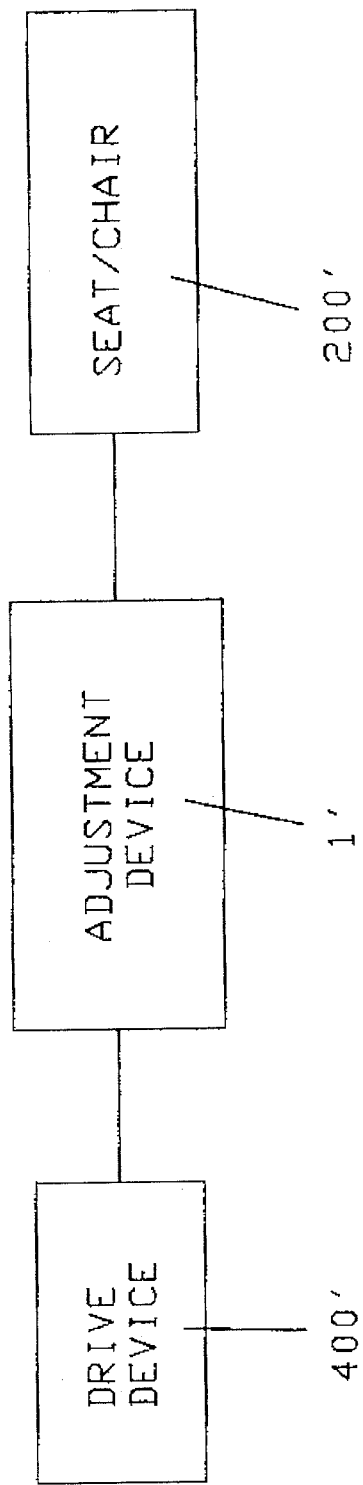
FIG. 6 shows the adjustment element in conjunction with a seat or chair.

FIG. 6 shows an adjustment device 1' and a drive device 400', as described in previous embodiments, in conjunction with a seat or chair 200'. The adjustment device 1', in this embodiment could be utilized to adjust the height of the seat or chair 200'.

Figure 7:
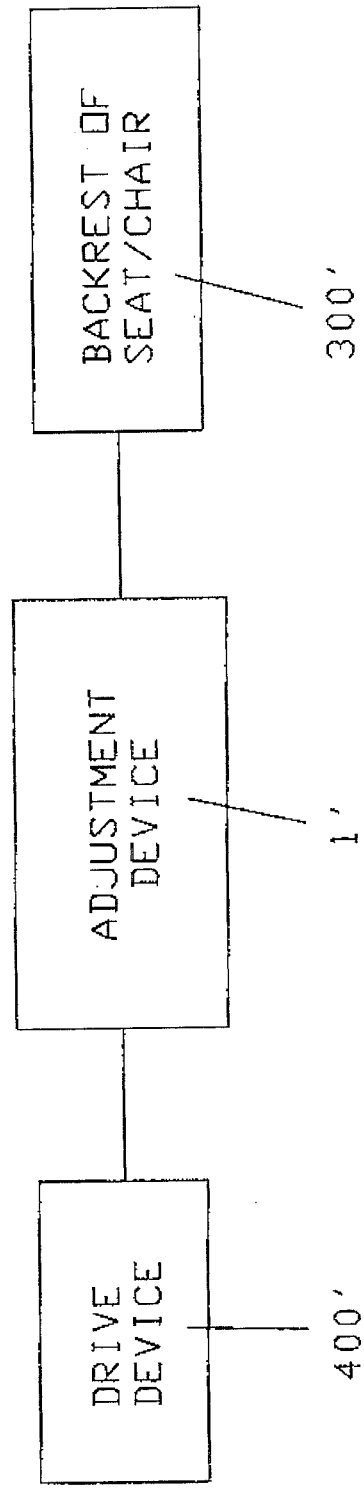
FIG. 7 shows the adjustment element in conjunction with a backrest of a seat or chair.

FIG. 7 shows the adjustment device 1' and the drive device 400', as described in previous embodiments, in conjunction with a backrest 300' of a seat or chair. The adjustment device 1', in this embodiment could be utilized to adjust the position of the backrest 300'.

Figure 8:
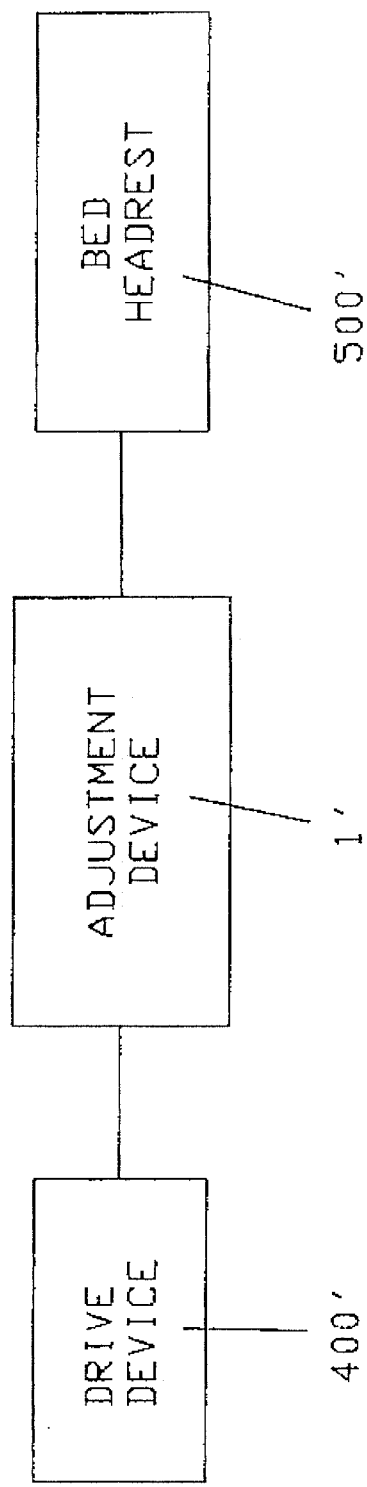
FIG. 8 shows the adjustment element in conjunction with a headrest of a bed.

FIG. 8 shows the adjustment device 1' and the drive device 400', as described in previous embodiments, in conjunction with a headrest 500' of a bed. The adjustment device 1', in this embodiment could be utilized to adjust the position of the headrest 500' of the bed.

Figure 9:
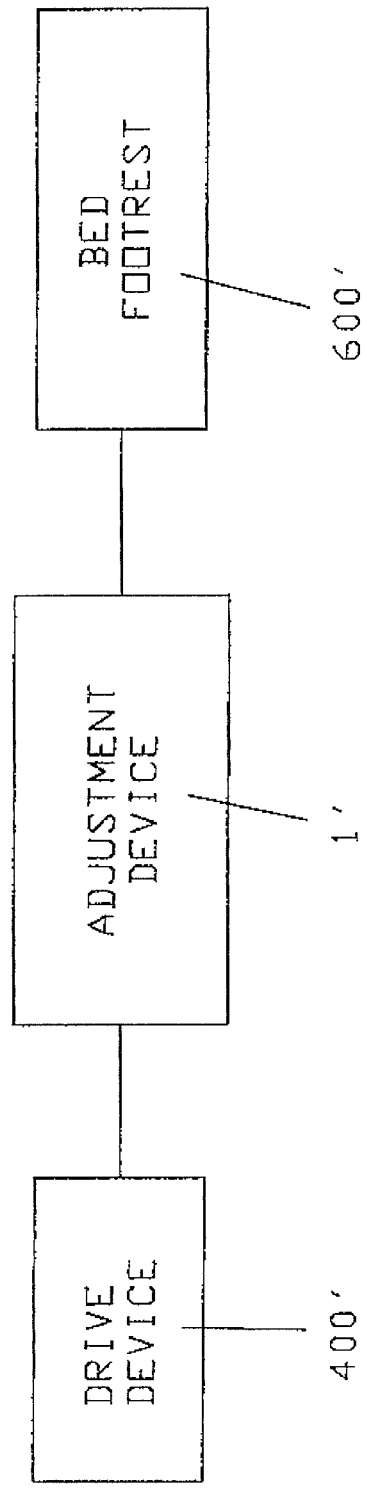
FIG. 9 shows the adjustment element in conjunction with a footrest of a bed.

FIG. 9 shows the adjustment device 1' and the drive device 400', as described in previous embodiments, in conjunction with a footrest 600' of a bed. The adjustment device 1', in this embodiment could be utilized to adjust the position of the footrest 600' of the bed.

Figure 10:
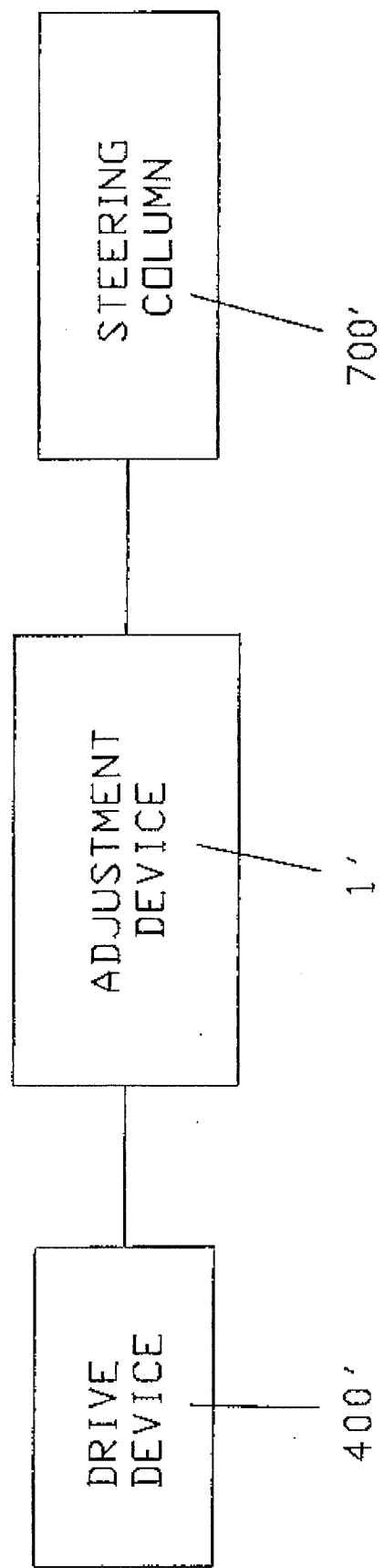
FIG. 10 shows the adjustment element in conjunction with a steering column of a motor vehicle.

FIG. 10 shows the adjustment device 1' and the drive device 400', as described in previous embodiments, in conjunction with a steering column 700' of a motor vehicle. The adjustment device 1' could be utilized to adjust the position of the steering column 700' of the motor vehicle.

The disclosure now turns to additional, related embodiments of the present invention.

Figure 11:
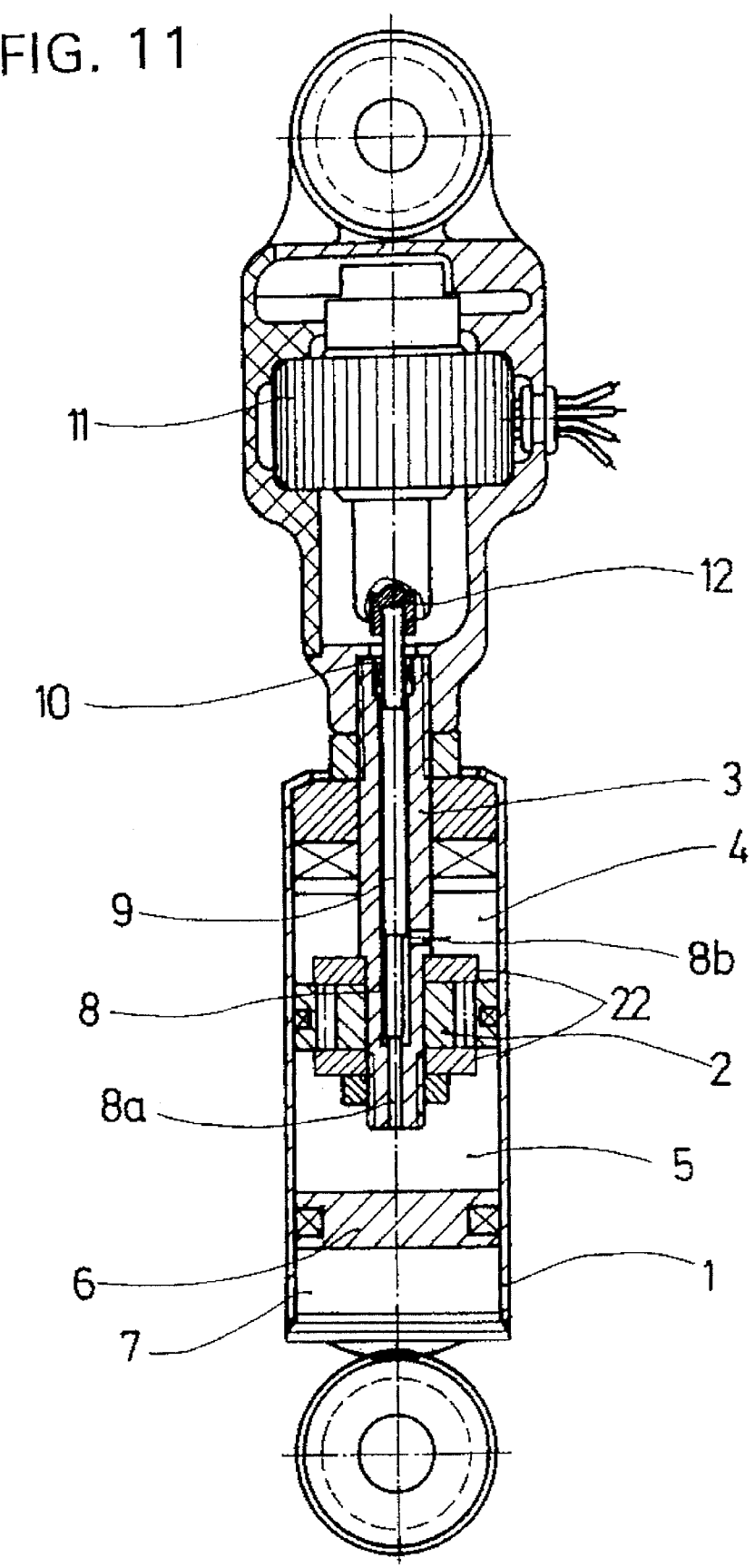

FIG. 11 shows a shock absorber with an adjustable damping force in which, in a work cylinder 1, piston 2 can preferably divide the work cylinder 1 into upper work chamber 4 and lower work chamber 5. The piston 2 can preferably be connected to piston rod 3, which piston rod 3 is preferably externally guided. To compensate for the volume of the piston rod 3 when the piston rod 3 is inserted, there can preferably be an equalization chamber 7 and also a separating piston 6. For basic damping, the piston 2 can preferably have damping valves 22, which are effective in the decompression and compression direction.

The piston rod 3 can preferably have a cavity 8 in which cavity 8 the control rod 9 and the longitudinal hole 8a can preferably form a seat valve. A bypass can preferably connect the upper work chamber 4 and the lower work chamber 5 by means of the hole 8b. The control rod 9 is preferably sealed from the atmosphere by means of a gasket 10, and preferably extends outwardly of the piston rod 3. Between a motor 11 and the control rod 9, there can preferably be a tripping element 12, which tripping element 12 is preferably configured to act on the control rod 9 in such a manner as to displace the control rod 9 axially. The drive device is described in detail further below, and is illustrated in the accompanying figures.

Thus, in accordance with a preferred embodiment of the present invention, motor 11 may preferably be configured to provide a rotational movement which is then converted into an axial movement of control rod 9. Tripping element 12 can preferably be configured to accomplish this purpose. In this respect, for example, tripping element 12 may, according to one preferred embodiment of the present invention, be constituted by a threaded spindle similar to the threaded spindle 13 discussed further below with respect to FIG. 12. Of course, other appropriate means for converting the rotational driving movement of motor 11 to an axial movement of control rod 9 may be utilized.

Further, in accordance with an additional embodiment, equalization chamber 7, which can have a high pressure value, may provide pressure to chamber 5, which may bias the control rod 9 outwardly with respect to the piston rod 3.

Figure 11A:
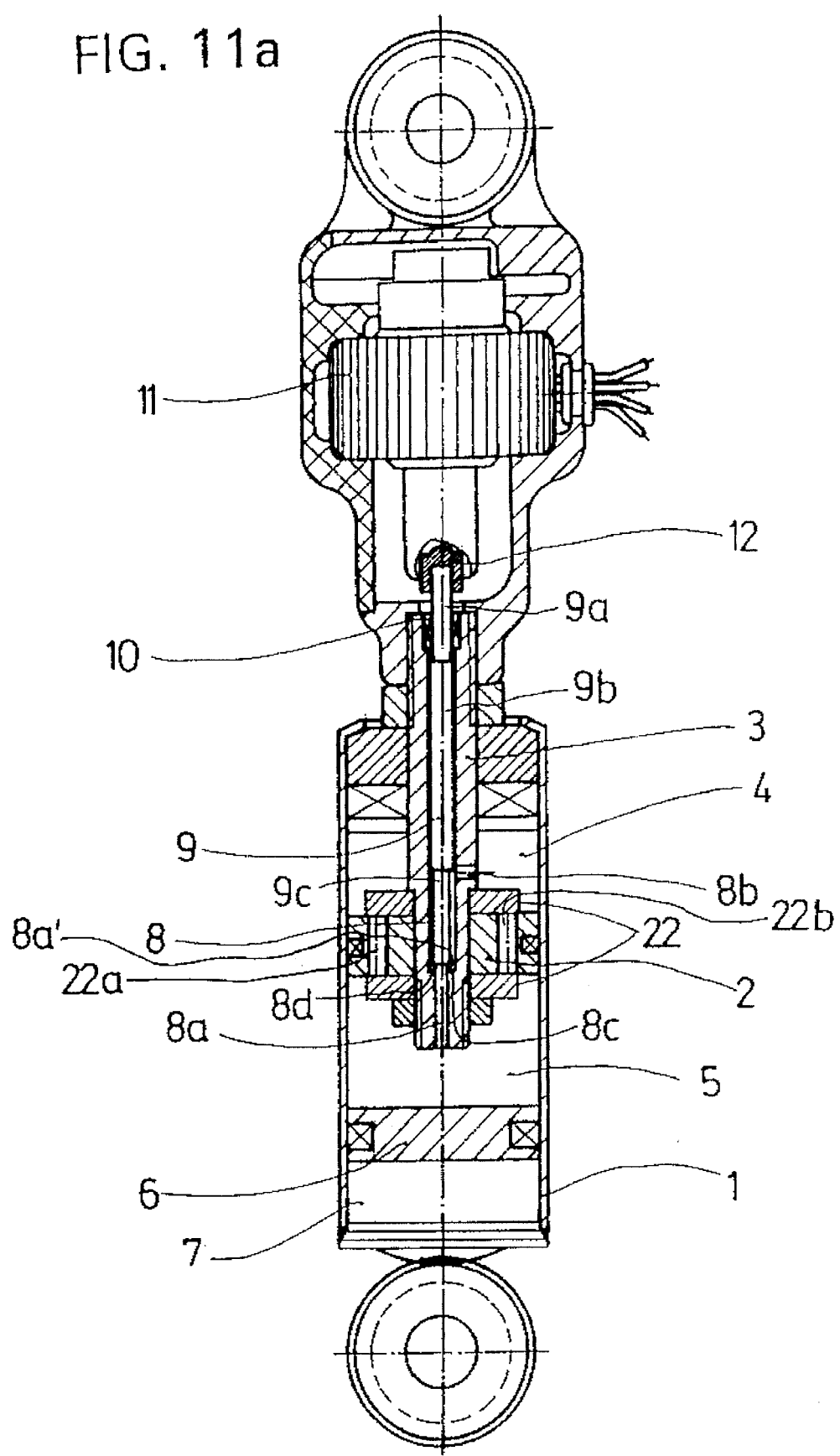
FIG. 11a shows substantially the same view as FIG. 11, but shows additional components.

With reference now to FIG. 11a, fluid communication may preferably be provided between upper work chamber 4 and lower work chamber 5 by means of the bypass mentioned above and also by means of passages 22a and 22b and corresponding valves 22. The operation of such valves 22 in conjunction with passages 22a and 22b is generally well-known to those of ordinary skill in the art.

An example of a type of damping valve which may be utilized in accordance with the present invention can be found in U.S. Pat. No. 4,986,393 (Preukschat et al., Jan. 22, 1991). Such valves are shown in FIG. 3 of U.S. Pat. No. 4,986,393, indicated at 7.1.1, 7.1.2, 7.2.1 and 7.2.2.

Figure 15:
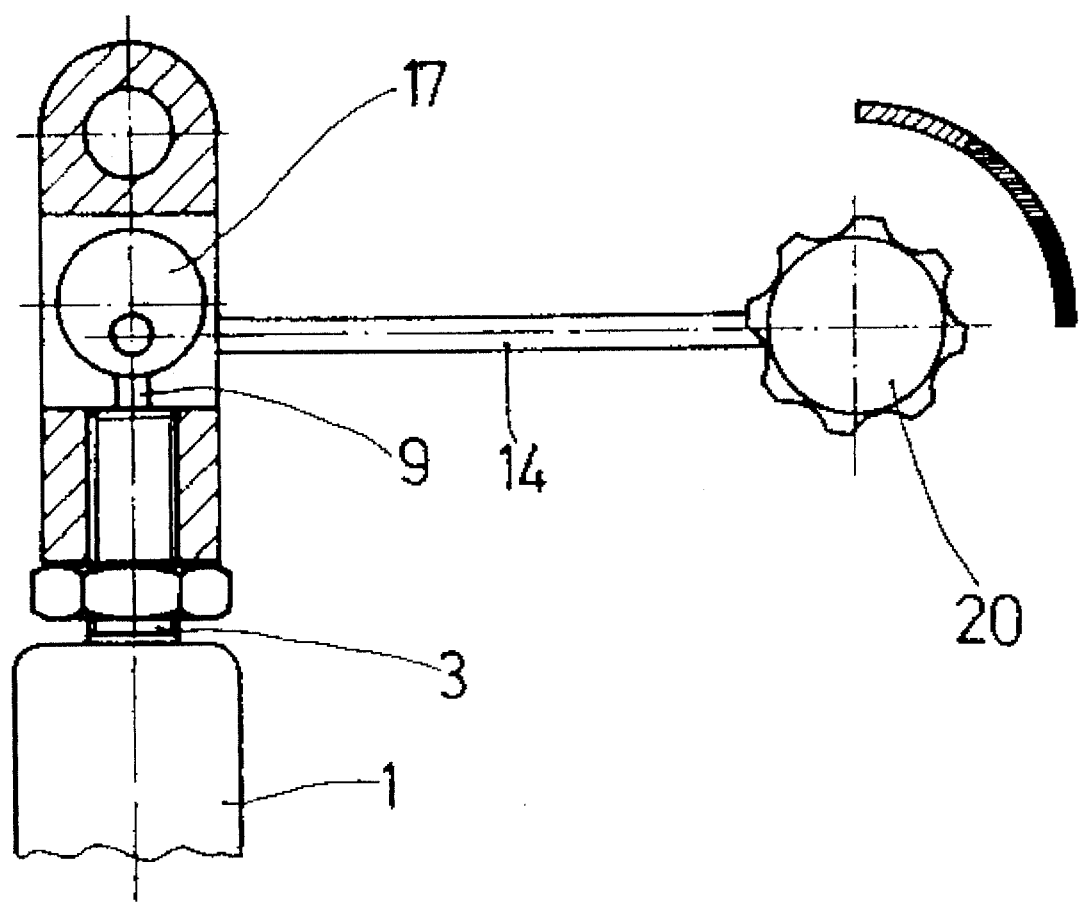

Another type of damping valve which may be utilized in accordance with the present invention can be found in U.S. Pat. No. 4,749,070 (Moser et al., Jun. 7, 1988). Such valves are shown in FIGS. 15 and 24 of U.S. Pat. No. 4,749,070, and are indicated in FIG. 24 at 17''' and 22'''.

Yet another type of damping valve which may be utilized in accordance with the present invention can be found in U.S. Pat. No. 4,723,640 (Beck, Feb. 9, 1988). Such valves are shown in FIG. 1 of U.S. Pat. No. 4,723,640, indicated at 23 and 24.

It will be appreciated that the types of damping valves discussed immediately above could essentially be employed in the capacity of damping valves 22 shown in FIG. 11 and, as such, would essentially permit flow between the upper work chamber 4 and lower work chamber 5 during movement of the piston 2 in either axial direction. Of course, it should be understood, and it will be readily apparent to those of ordinary skill in the art, that types of damping valves other than those discussed immediately above, which would permit at least some fluid communication between upper work chamber 4 and lower work chamber 5, may be utilized within the scope of the present invention.

On the other hand, the bypass connection between upper work chamber 4 and lower work chamber 5 is preferably provided by longitudinal hole or passage 8a, lateral hole or passage 8b, and longitudinal bore 8c. As shown, longitudinal bore 8c preferably has an annular lower end 8d. Lateral passage 8b preferably extends between upper work chamber 4 and longitudinal bore 8c, while longitudinal passage 8a preferably extends between longitudinal bore 8c and lower work chamber 5. In accordance with a preferred embodiment of the present invention, as shown in FIG. 11a, longitudinal passage 8a may essentially enter into longitudinal bore 8c eccentrically and in such a manner that longitudinal passage 8a essentially extends past the lower end 8d of longitudinal bore 8c and continues as a semicylindrical gulley, indented into the interior cylindrical wall of longitudinal bore 8c, through a given axial distance from lower end 8d.

Alternatively, although not expressly illustrated in FIG. 11a, the longitudinal passage 8a may terminate at the lower end 8d of bore 8c and could, in one embodiment, be eccentric with respect to bore 8c and, in an alternative embodiment, could be concentric with respect to bore 8c.

Control rod 9, as shown, may preferably be constituted by three distinct sections 9a, 9b and 9c, wherein 9a is an upper section of reduced diameter, 9b is a central section of enlarged diameter, and 9c is a lower section of reduced diameter. Upper section 9a may preferably be concentric with respect to central section 9b. Preferably, lower section 9c is positioned so as to be concentric with longitudinal passage 8a. Additionally, the lower end of lower section 9c, that is, the end towards lower end 8d of bore 8c, may preferably be beveled so as to have a frustoconical, as opposed to a cylindrical, cross-section. In accordance with one preferred embodiment of the present invention, this frustoconical end of lower section 9c of control rod 9 may preferably be configured to fit into the end 18a of longitudinal passage 8a in the manner of a seat valve.

As illustrated in FIG. 11a, the control rod 9 is preferably configured such that, upon axial displacement of control rod 9, the effective cross-section of passages 8a and/or 8b are varied so as to vary damping. As shown, central portion 9b of control rod 9 essentially occupies the entire cross-section of longitudinal bore 8c, while lower portion 9c occupies essentially a major portion, but not all, of bore 8c. As shown, in accordance with a preferred embodiment of the present invention, bypass flow preferably takes place, in a sequence depending on the direction of travel of the piston 2, through lateral passage 8b, through that portion of bore 8c not otherwise occupied by lower portion 9c of control rod 9, and through longitudinal passage 8a. The cross-section of passage 8b may preferably be reduced by the introduction, through axial displacement of control rod 9, of central portion 9b of control rod 9 thereover. Additionally, the simultaneous approach of the end of control rod 9 towards the lower end 8d of bore 8c may also preferably serve to reduce the flowrate through longitudinal passage 8a.

It will be appreciated that the configuration of control rod 9 and of the passages 8a, 8b and 8c described hereinabove can preferably be employed in accordance with the embodiments of the present invention discussed with relation to FIGS. 10–15 hereinbelow. It is also conceivable to utilize other control rod arrangements for adjusting bypass flow through a piston rod other than the arrangements described hereinabove.

Figure 12:
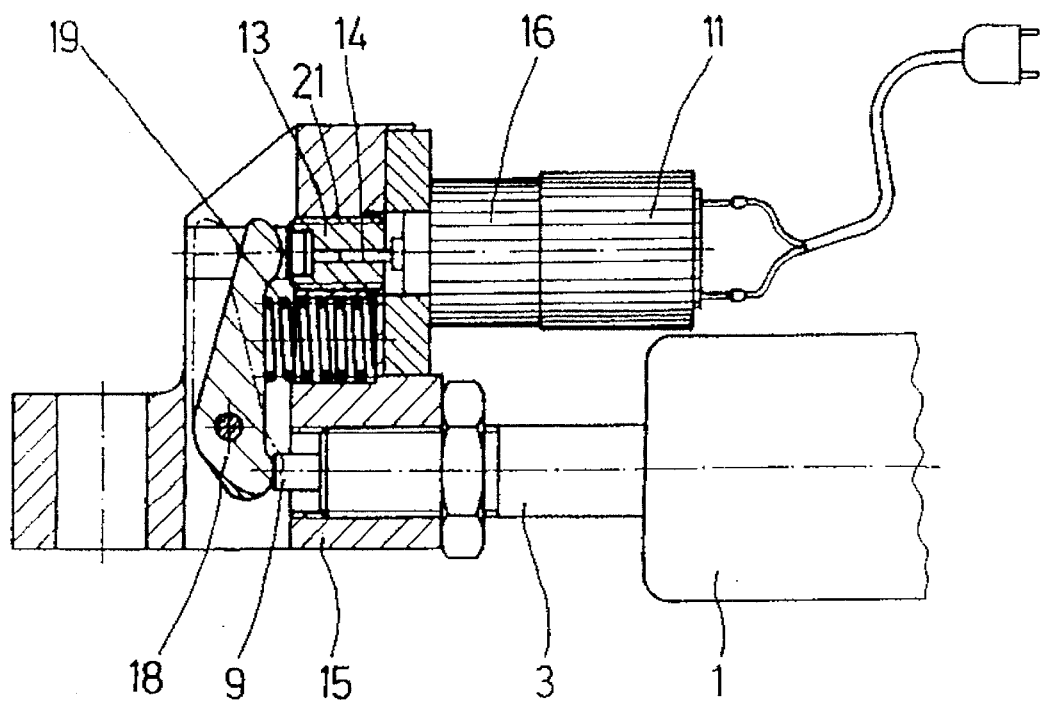

FIG. 12, in accordance with a preferred embodiment of the present invention, shows a work cylinder 1 of a shock absorber, in which the piston rod 3 extends outwardly from the work cylinder 1. A cavity or bore in the piston rod 3 can preferably contain the control rod 9. The control rod 9 can preferably be actuated by the drive device. The piston rod 3 can preferably be connected to a housing 15, preferably by means of a locking nut 3a (see FIG. 12a), whereby the housing 15 also contains a motor 11. The motor 11 is preferably oriented so that a threaded spindle 13 is driven by the drive shaft 14 of the motor 11. The drive shaft 14 and the threaded spindle 13 are preferably connected to one another so that they are essentially torsionally stationary in relation to one another, but the drive shaft 14 can preferably move axially in a hole in the threaded spindle 13, so that the threaded spindle 13 can execute an axial movement by means of its external screw thread 21. The threaded spindle 13 and the housing 15 can thus form a screw transmission, the housing 15 preferably having an internal thread 15b (see FIG. 12a), in which the rotation of the motor 11 can preferably be converted into a translational movement by means of the screw thread 21, and actuates the control rod 9 accordingly. In the embodiment illustrated in FIG. 12, the axial movement of the threaded spindle 13 is preferably transmitted to a lever 18, and applied to the control rod 9 by means of the fulcrum of lever 18.

Figure 12A:
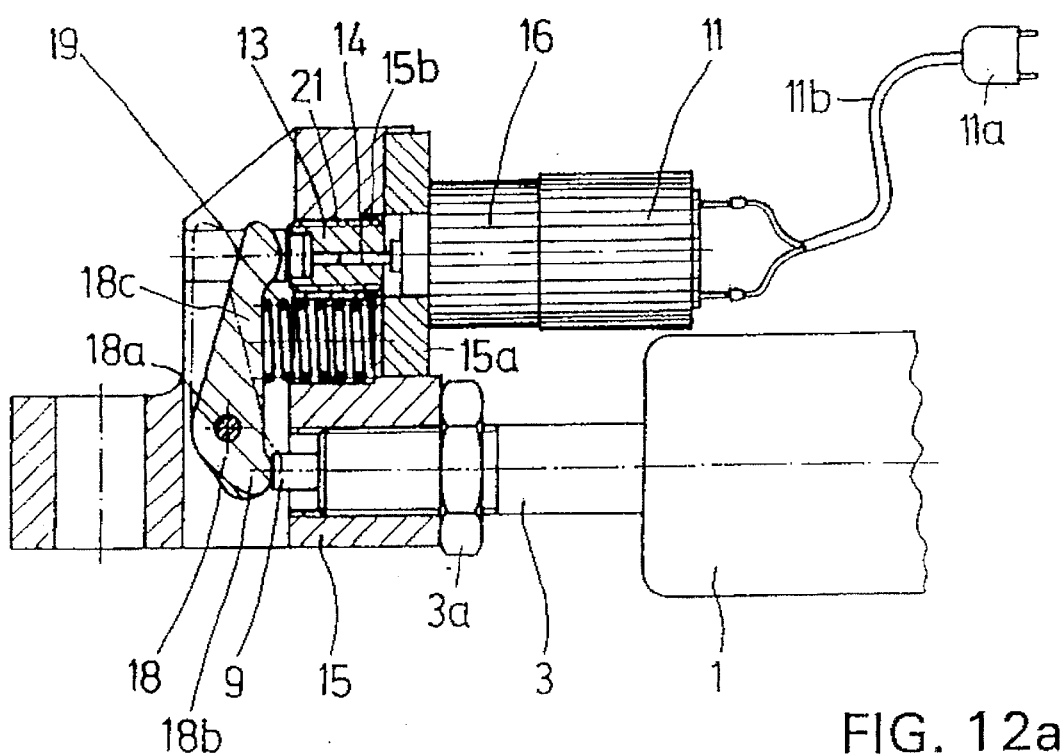
FIG. 12a shows substantially the same view as FIG. 12, but shows additional components.

FIG. 12a illustrates fulcrum 18a, about which lever 18 can preferably pivot. Fulcrum 18a may preferably be embodied by a pivot pin or the like. FIG. 12a also illustrates a plug 11a, with electrical connections 11b, which can preferably provide electrical power to motor 11, and the locking nut 3a which can preferably attach the piston rod 3 to the housing 15.

In accordance with one embodiment of the present invention, lever 18 can have two portions 18b and 18c, the first portion 18b being adjacent the control rod 9, and the second portion 18c being adjacent the spindle 13. The first portion 18b of the lever 18 preferably has a lesser length than the second portion 18c. This difference in length of 18b and 18c may provide a magnification in the force provided by the spindle 13 to the control rod 9.

With further reference to FIG. 12a, in one embodiment the spring 19 may be a tension spring 19, which may bias a portion 18c of lever 18 in a clockwise direction, preferably towards spindle 13. Tension spring 19 may be connected to housing 15a and to portion 18c in ways well known to a person having ordinary skill in the art.

Alternatively, according to an additional embodiment, portion 18c may have a portion that engages with spindle 13, such that as spindle 13 retracts in a clockwise direction, spindle 13 also pulls portion 18c in a clockwise direction, thus preferably moving an additional portion 18b in a counterclockwise direction.

Alternatively, according to yet an additional embodiment, the pressure exerted by control rod 9 may be sufficient such that a compressional spring 19 could possibly be employed. In this case there would be no need for a connection between portion 18c and spindle 13 in order to pull portion 18c in a clockwise direction. When the spindle 13 then exerts a force against portion 18c, thus moving portion 18c in a counterclockwise direction, portion 18b would then preferably exert a force on control rod 9.

According to a preferred embodiment, because the fluid within the adjustment device 1 is preferably under pressure, in many embodiments, the pressure of the control rod 9 against portion 18b should be sufficient to bias portion 18c against the spindle 13.

In an alternative embodiment of the present invention, in which the pressure of the control rod 9 against portion 18b would not be sufficient, then a connection between the spindle 13 and the upper portion 18c of the lever 18 may be required which connection may be accomplished by a ball and socket arrangement. Spindle 13 may be configured to have a ball at the end facing portion 18c. Portion 18c may then be configured to receive the ball of spindle 13. Further, portion 18b and the end of control rod 9 may be configured in a similar manner. Alternatively, spindle 13 may be configured to receive a ball located on portion 18c. Portion 18b and the end of the control rod 9 facing portion 18b may be configured in a similar manner.

For a permanent actuation of the seat valve of the bypass of the shock absorber, without the input of additional electrical energy, the screw transmission which is preferably comprised of the threaded spindle 13, housing 15 and screw thread 21 should preferably have a sufficient automatic locking. A spring 19 can preferably provide a power assist.

Thus, in accordance with a preferred embodiment of the present invention, threaded spindle 13 is preferably configured, by means of its external screw thread 21, to displace axially in response to the rotational driving force provided by motor 11, and thus provide a pivoting force on lever 18 to push control rod 9 axially in a closing direction. Spring 19 may preferably be provided to essentially provide a biasing force on lever 18 in the pivoting direction corresponding to the closing direction of control rod 9, such that the biasing may preferably provide a power assist for the action of spindle 13 on lever 18. A transmission 16 may preferably be provided between motor 11 and spindle 13 to ensure that spindle 13 rotates at an appropriate rotational velocity in response to the rotational movement of motor 11. Such transmissions are generally well-known to those of ordinary skill in the art and will not be further described here.

To enable axial displacement of threaded spindle 13, according to the preferred embodiment, the drive shaft 14 can preferably be provided with a slot along the exterior surface of the drive shaft 14. The slot can preferably extend along the entire axial length of the drive shaft 14, or along only a portion of the drive shaft 14. The spindle 13 can then preferably be provided with a key or projection which key can then fit into the slot of the drive shaft 14, in order to provide a torsionally stationary relationship between the spindle 13 and the drive shaft 14, while allowing the spindle 13 and the drive shaft 14 to preferably move axially with respect to one another.

Alternatively, to enable axial displacement of threaded spindle 13, the drive shaft 14 may be provided with an external thread to engage with an internal thread of threaded spindle 13, whereby rotation of drive shaft 14 would essentially translate directly into axial displacement of threaded spindle 13. In such an instance, external threads may or may not be needed on spindle 13. Of course, it should be understood that any appropriate means may be employed, within the scope of the present invention, to convert a rotational displacement of drive shaft 14 into pivoting displacement of lever 18.

Figure 13:
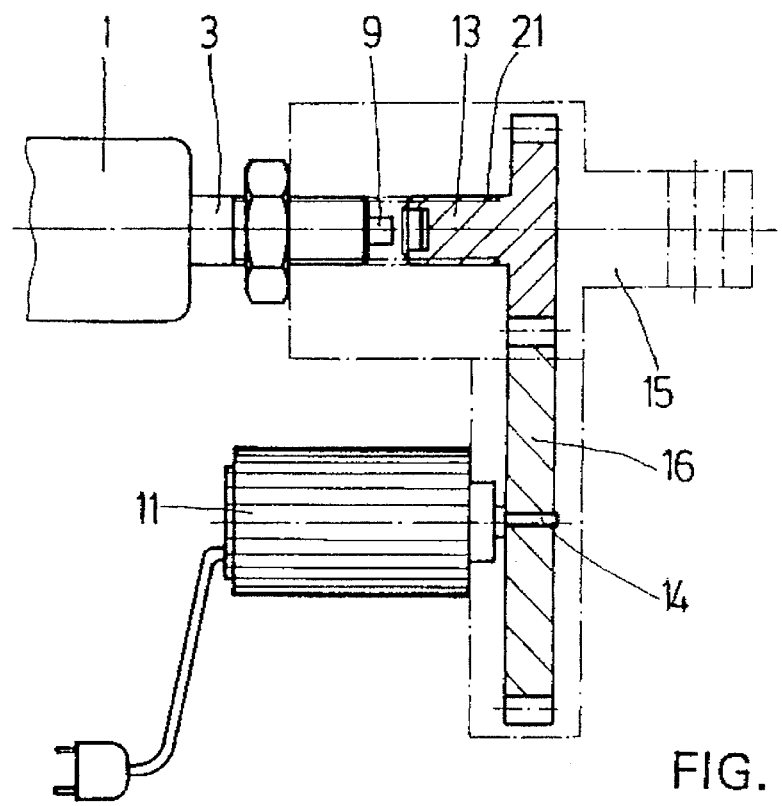

FIG. 13 shows an additional axially parallel orientation of the motor 11 and work cylinder 1, whereby in contrast to FIG. 12 there is no lever 18, but, instead, a gear wheel transmission 16. The gear wheel transmission 16 can preferably be used to transmit the rotation of the drive shaft 14 to the threaded spindle 13. As a result of the rotation of the drive shaft 14, via the two gear wheels, an axial movement of the threaded spindle 13 can result, preferably by means of the screw thread 21 of the threaded spindle 13.

Figure 13A:
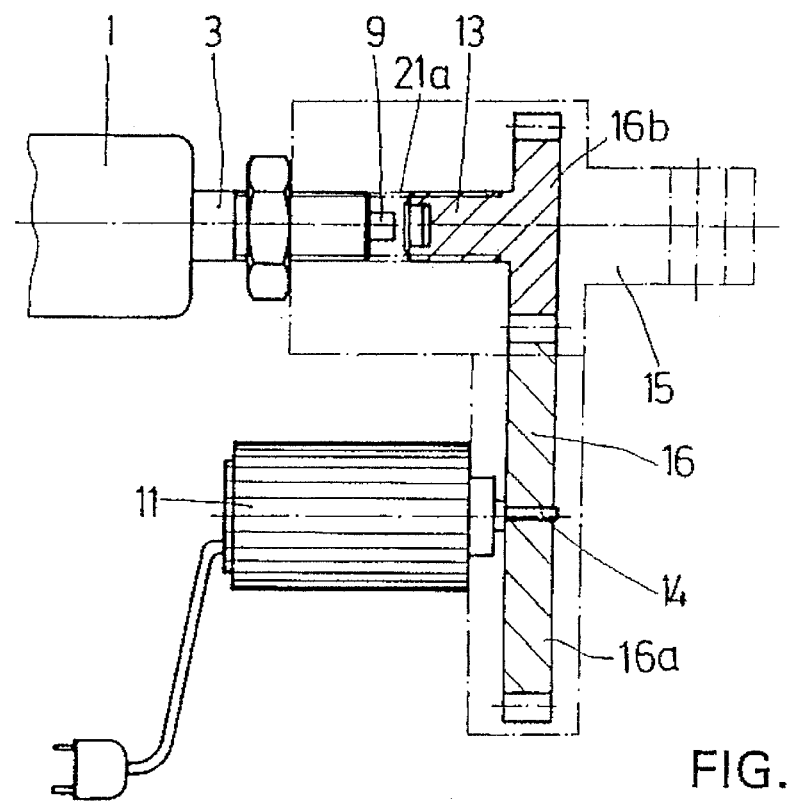
FIG. 13a shows substantially the same view as FIG. 13, but shows additional components.

Thus, in accordance with a preferred embodiment of the present invention, as shown in FIG. 13a, a gear wheel transmission 16 may preferably be provided to transmit the rotation of the drive shaft 14 to the threaded spindle 13. In this respect, gear wheel transmission 16 may preferably include two gear wheels 16a and 16b, the former being associated with drive shaft 14 and the latter being associated with spindle 13. In one embodiment of the present invention, the spindle 13 may be integral with gearwheel 16b. Upon rotation of spindle 13 and gearwheel 16b, an annular member 21a, generally in the form of a hollow cylinder, and provided with external threads to engage with internal threads on housing 15, and also provided with internal threads to engage with external threads on spindle 13, may displace axially to effect axial displacement of control rod 9. As such, annular member 21a may be directly connected with control rod 9.

With regard to the annular member 21a, in order to provide a locus for contacting and axially displacing control rod 9, there may preferably be a disc member disposed across the annular member 21a at that end portion of annular member 21a which faces control rod 9. In accordance with a preferred embodiment of the present invention, this disc member may be directly connected to control rod 9 so that control rod 9 could displace both rotatingly and axially in concert with annular member 21a. Alternatively, the disc member and the control rod could conceivably be disconnected with respect to one another, in which case the fluid pressure present within work cylinder 1 may be sufficient to afford retraction of control rod 9 back towards gearwheel 16b upon retraction of gearwheel 16b away from control rod 9.

In a further alternative embodiment of the present invention, the thrust washer (see FIG. 3a) may essentially provide a recess for the receipt of an end portion of control rod 9 therewithin. External threading on the end portion of control rod 9 could conceivably engage with internal threading on the recess, wherein such external threading and internal threading would be configured such that, upon rotation of gearwheel 16b, the control rod 9 would displace axially.

In a further alternative embodiment of the present invention, gearwheel 16b could have a sufficient axial dimension to allow for axial displacement of gearwheel 16b during the transfer of a rotational driving force from gearwheel 16a to gearwheel 16b. This would conceivably be facilitated by external screw thread 21 on threaded spindle 13, which threaded spindle 13 would essentially be integral with gearwheel 16b. Accordingly, there would preferably be internal threads on housing 15 to engage with external screw thread 21.

Of course, other appropriate means for converting the rotational movement of gearwheel 16b into an axial movement of control rod 9 may be utilized within the scope of the present invention.

Figure 14:
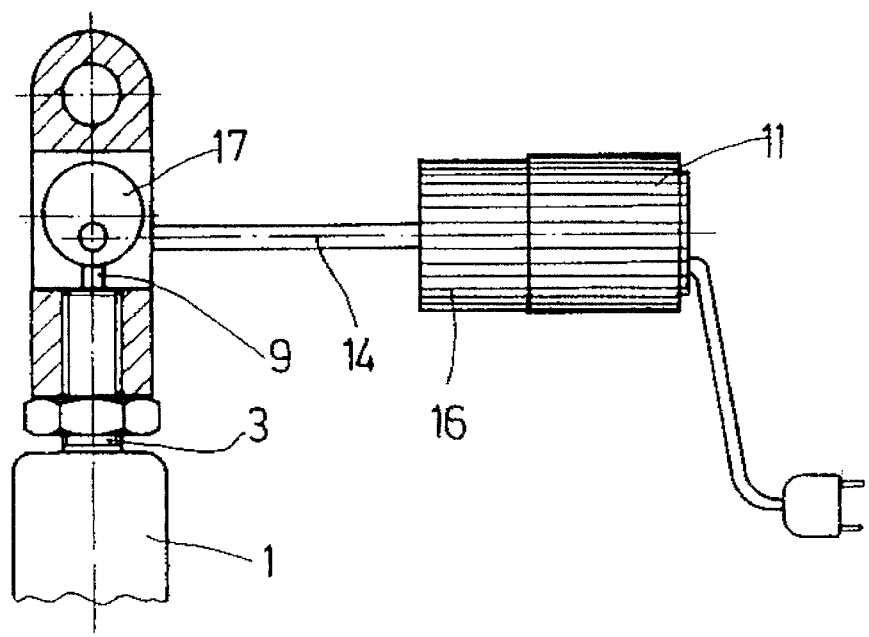

FIG. 14 shows a drive device, whereby the control rod 9 can preferably actuated directly by a cam 17, whereby the cam 17 can preferably be mounted eccentrically. When the cam 17 is rotated by the drive shaft 14, the cam 17 preferably executes a corresponding axial movement to actuate the control rod 9.

Figure 14A:
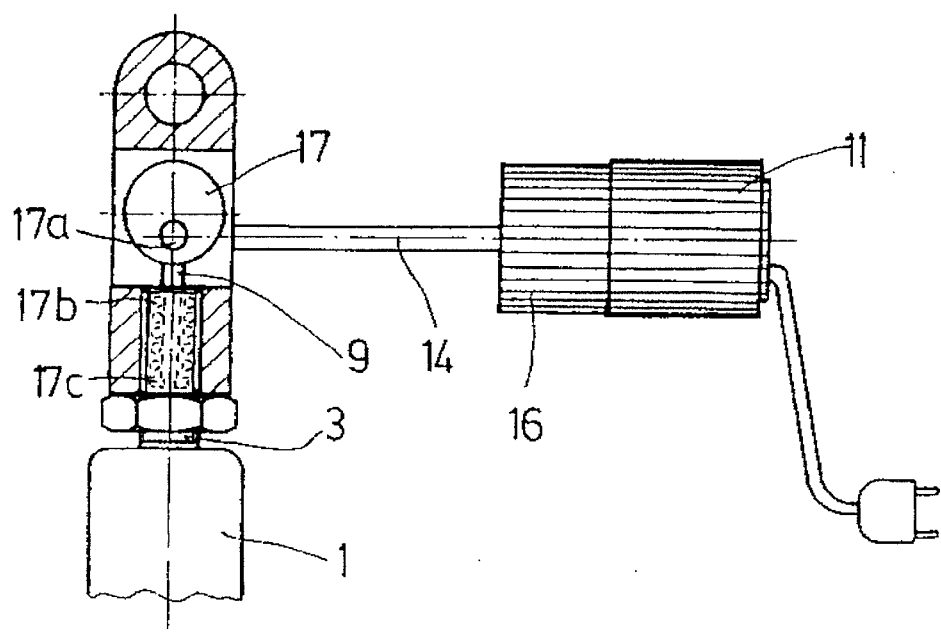
FIG. 14a shows substantially the same view as FIG. 14, but shows additional components.

Thus, in accordance with a preferred embodiment of the present invention, the rotation of drive shaft 14 may preferably be converted into the rotation of a cam 17 to effect axial displacement of control rod 9. As shown in FIG. 14a, cam 17 preferably has a locus of rotation 17a. Drive shaft 14 may provide a direct, coaxial driving force to this locus of rotation 17a or may, conceivably, provide the rotational driving force to locus of rotation 17a through an intermediate gear arrangement (not shown), which gear arrangement may include bevel gears which change the motion of the drive shaft 7' by 90°. Such an intermediate gear arrangement, the nature of which will be readily apparent to those of ordinary skill in the art, may be employed, for example, when the drive shaft 14 is perpendicular to the rotational axis of cam 17 or even disposed at another angle with respect thereto. In any of the examples just discussed with relation to FIG. 14a, the locus of rotation 17a may preferably be integral with the cam 17.

In one preferred embodiment of the present invention according to FIG. 14a, the cam 17 and control rod 9 may preferably be disconnected with respect to one another. A biasing arrangement, including possibly a spring 17b and a mounting surface 17c for mounting one end of such a spring 17b, may be provided to bias control rod 9 towards cam 17. Thus, upon rotational displacement of cam 17 away from the position illustrated in FIG. 14a, the control rod 9 will preferably be displaced downwardly until that portion of cam 17 having a maximum radius is in contact with the end of control rod 9. Similarly, upon rotational displacement of cam 17 away from the position of maximum downward displacement of control rod 9, the biasing of control rod 9 would essentially ensure retraction of control rod 9 away from the maximum downward position. Alternatively, spring 6d' may not be needed if the pressure in the adjustment device 1' is sufficiently high.

It will be appreciated that, with regard to the transmission 16 described hereinabove with reference to several embodiments of the present invention and illustrated in several drawings, the transmission 16 is preferably configured to downstep the rotational speed of motor 11 to a level more appropriate for effecting the relatively small rotational movements required for displacing control rod 9 axially. Where no such transmission is described or illustrated with relation to a motor 11, it is to be understood that such a transmission could still be included, if appropriate.

FIG. 15 is a schematic diagram of a drive device similar to the one illustrated in FIG. 14, with the distinction that the drive shaft 14 can preferably be driven by a manual actuation device 20. The latter can be a simple handwheel or similar device.

Thus, according to a preferred embodiment of the present invention, the arrangement shown in FIG. 15 may, apart from the manual actuation device 20, conceivably include the characteristics illustrated and described with reference to FIG. 14a.

With reference to all of the embodiments described herein-above with relation to FIGS. 11–15, the control rod 9 according to the present invention could conceivably be actuable solely between a "locked" state and an "unlocked" state. Particularly, conceivably, the control rod 9 could be positionable solely between a first position, wherein there is an essentially completely free bypass flow of fluid between upper work chamber 4 and lower work chamber 5, and a second position, wherein the control rod 9 would essentially completely block bypass flow of damping fluid between upper work chamber 4 and lower work chamber 5.

Figure 16:
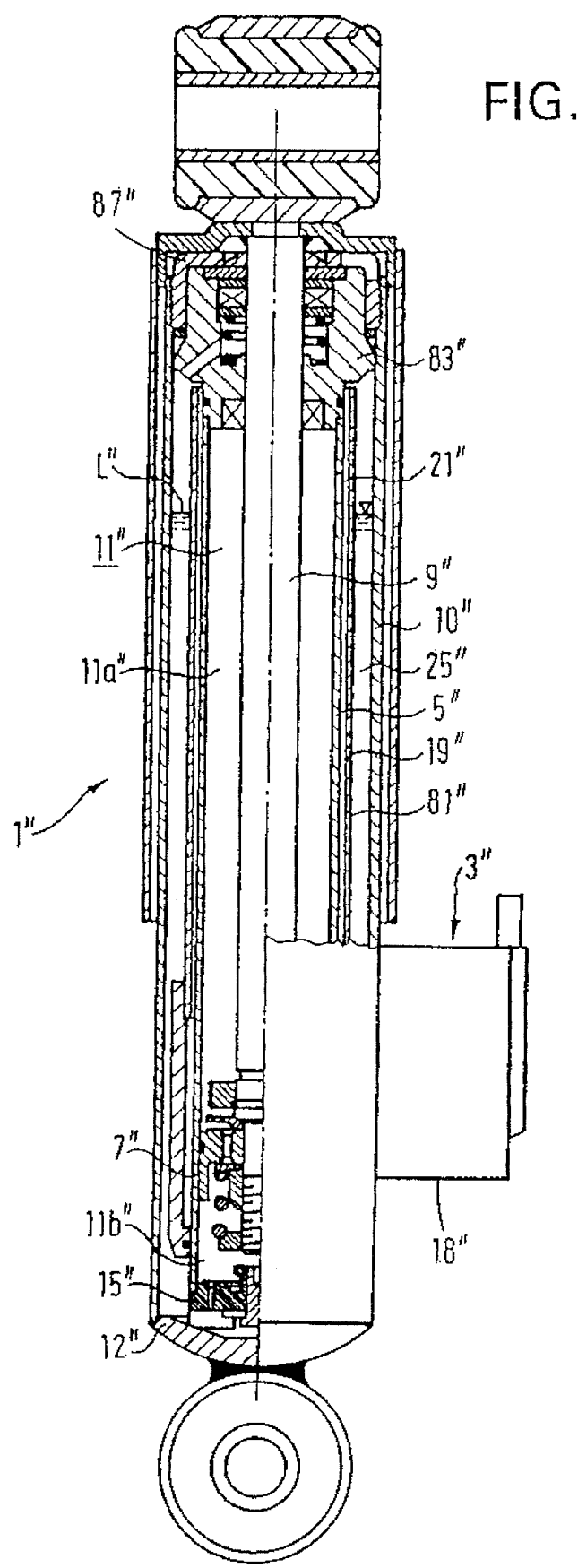
Figure 17:
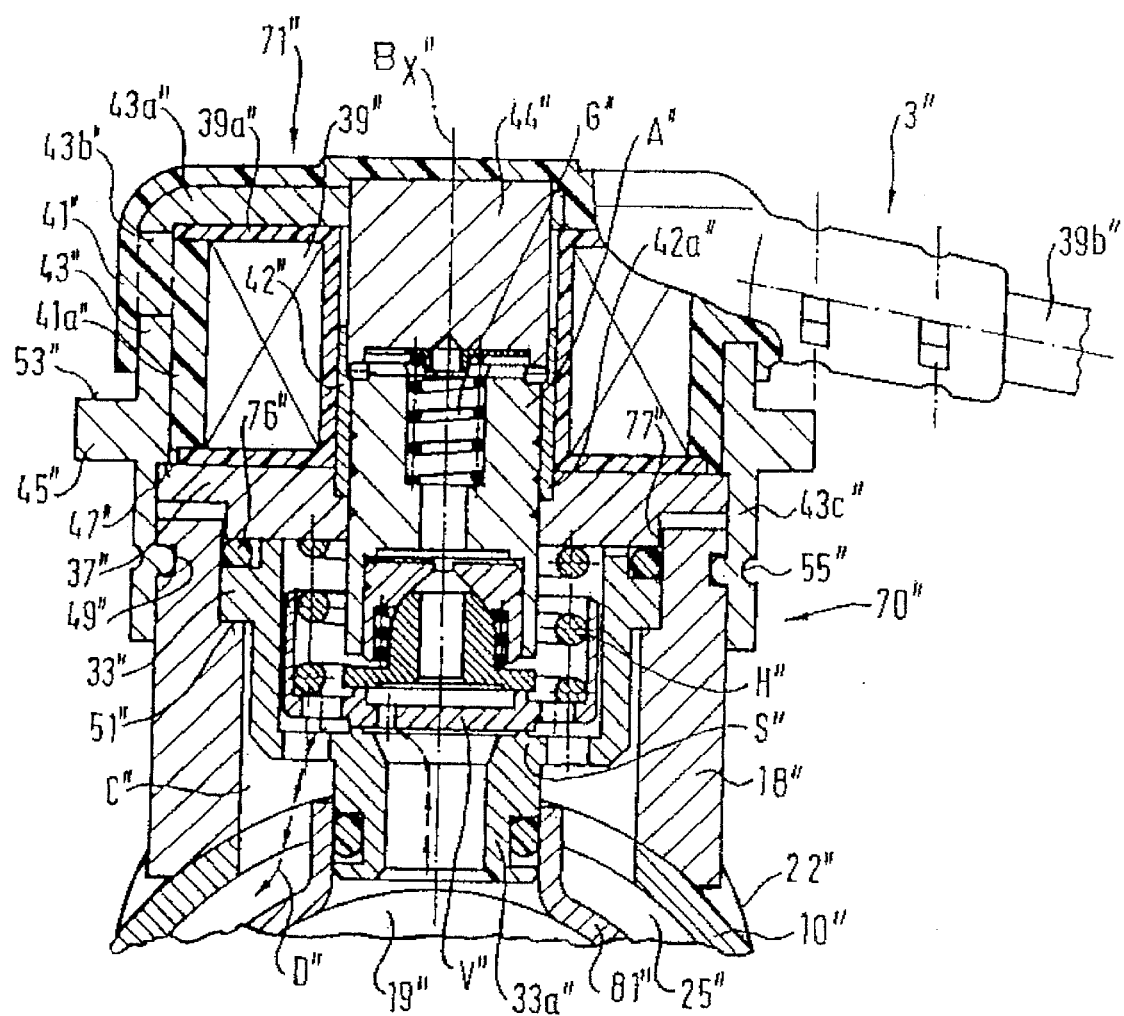

FIG. 16 shows a complete oscillation damper, shock absorber or vibration damper 1", which could incorporate the embodiments of present invention of FIGS. 1–15, a detailed illustration of the valve unit 3" being omitted for the sake of clarity. The embodiment shown in FIGS. 16 and 17 is present only as a non-restrictive example. The oscillation damper 1" consists essentially of a pressure pipe 5" in which a piston 7" on a piston rod 9" divides a working space 11" into an upper or piston-rod-side working chamber 11b". A bottom valve unit 15" closes the pressure pipe 5" at the lower end thereof. A fluid path 19" is formed between the pressure pipe 5" and an intermediate pipe 81" said intermediate pipe 81" being arranged concentrically with respect to the pressure pipe 5". A connecting orifice 21" in the pressure pipe 5" connects the upper working chamber 11a" with the fluid path 19". A compensating chamber 25" is confined between the intermediate pipe 81" and a portion of the pressure pipe 5", on the one hand, and the container tube 10" on the other hand. This compensating chamber 25" is axially limited by a base member 12" and a piston rod guiding and sealing unit 83". There can also be a cap 87" disposed adjacent the piston rod guide and sealing unit 83". The working space 11" is separated by the piston 7" into the upper working chamber 11a" and the lower working chamber 11b". Both the upper and the lower working chamber are filled with a liquid. The compensating chamber 25" is also filled with damping liquid up to the level L" and contains a possibly pressurized gas above the level L". The bottom valve unit 15" provides communication between the working chamber 11b" and the compensating chamber 25". The piston 7" provides communication between the lower working chamber 11b" and the upper working chamber 11a". According to an illustrative example the oscillation damper works as follows: When the piston rod 9" moves upwards, a high flow resistance occurs across the piston 7" and a high pressure is generated in the upper working chamber 11a". Liquid from the upper working chamber 11a" flows through said high flow resistance into the lower working chamber 11b". As the piston rod 9" moves outward of the working space 11", the available volume within the working space 11" is increased. Therefore, liquid can flow from the compensating chamber 25" through the bottom valve unit 15" into the lower working chamber 11b". The flow resistance through the bottom valve unit 15" is small in this phase of operation. The movement of the piston rod 9" with respect to the pressure pipe 5" is damped.

On inward movement of the piston rod 9" fluid flows from the lower working chamber 11b" through the piston 7" into the upper working chamber 11a". The flow resistance across the piston 7" is relatively small and the flow resistance across the bottom valve unit 15" is relatively large. Therefore, a considerable pressure exists even within the upper working chamber 11a". The volume within the working space 11" is reduced by the piston rod 9' entering into the working space 11". Thus, damping liquid must flow from the lower working chamber 11b" through the bottom valve unit 15" into the compensating chamber 25". In this phase of operation the flow resistance through the bottom valve unit 15" is high such that a high pressure occurs within the lower working chamber 11b" and also within the upper working chamber 11a".

By the connecting orifice 21" and the fluid path 19" the upper working chamber 11a" is connected with the compensating chamber 25" via the valve unit 3". As long as the valve unit 3" is closed, the bypass established by the connecting orifice 21", the fluid path 19" and the valve unit 3" is also closed. This is the hardest mode of operation of the oscillation damper. When, however, the valve unit 3" is more or less opened, the bypass is also open. As a result thereof the following behavior exists: On upward movement of the piston rod 9" liquid can flow from the highly pressurized upper working chamber 11a" not only across the piston 7" providing a high flow resistance but also from the working chamber 11a" through the bypass 21", 19", 3" to the compensating chamber 25". Such, the damping force is reduced.

When the piston rod 9" moves downwards, there exists again a high pressure within the upper working chamber 11a", as described above. Therefore, damping liquid can flow from the upper working chamber 11a" through the bypass 21", 19", 3" to the compensating chamber 25". This means that the damping liquid which must be expelled from the working space 11" as a result of the reduced volume therein does not only escape through the bottom valve unit 15" to the compensating chamber 25" but can also partially escape through the bypass 21", 19", 3" to the compensating chamber 25". Such, the damping force is again reduced by the open bypass 21", 19", 3". It is to be noted that the direction of flow of the damping liquid through the bypass 21", 19", 3" is the same, both on upward movement and downward movement of the piston rod 9" with respect to the pressure pipe 5". By increasing the flow resistance through the valve unit 3" the damping force can be increased both for upward and downward movement of the piston rod 9", and by increasingly opening the valve unit 3" the damping force can be reduced both for upward movement and downward movement of the piston rod 9". It is possible to selectively open and close the valve unit or to continuously vary the flow resistance through the valve unit 3".

In FIG. 17 one can again see the fluid path 19" and the compensating chamber 25", which are interconnectable through the valve unit 3". The fluid path 19" is connected to the upper working chamber 11a". The flow direction from the fluid path 19" to the compensating chamber 25" across the valve unit 3" is indicated by the dotted line D" provided with arrows indicating the flow direction both for inward movement and outward movement of the piston rod 9" with respect to the pressure pipe 5". One can see in FIG. 17 a valve member v" which can be lifted with respect to a valve seat 5", such as to open the flow path D" from the fluid path 19" to the compensating chamber 25". Generally, it is sufficient to say that the valve member V" is urged downward in the closing sense towards the valve seat S" by a helical compression spring H" and that the valve member V" can be lifted in response to upward movement of an electromagnetic armature member A". This armature member A" is biased in downward direction by a helical compression spring G" and can be lifted by energization of a magnetic coil 39" which is energized through a current supply cable 39b".

The valve unit 3" comprises a housing 70". This housing 70" is composed by the side tube 18" and a cover unit 71". The side tube 18" is welded at 22" to the container tube 10". The cover unit 71" is fastened to the side tube 18".

A pot-shaped valve components housing 33" is inserted into the side tube 18" and is axially located on a shoulder face 51" inside the side tube 18". Various valve components are located inside the valve components housing 33". The lower end of the valve components housing 33" is shaped as a tube section 33a", which provides the valve seat S" and is sealingly connected to the fluid path 19".

The cover unit 71" comprises an iron jacket 43" integral with an iron end wall 43a". The iron jacket 43" and the iron end wall 43a" are coated with a plastic layer 41". An annular electromagnetic coil 39" is housed within the iron jacket 43". This electromagnetic coil 39" is carried by a coil carrier 39a", which is annular about the axis $B_x$" and is open in radial outward direction. The coil carrier 39a" is closed in radially outward direction by a plastics material 41a" integral with the plastic layer 41" through openings 43b" of the iron jacket 43". The plastics layer 41" and the plastics material 41a" are integrally moulded by injection moulding with the iron jacket 43", the iron end wall 43a" integral therewith and the electromagnetic coil 39" carrier 39a" being inserted into the injection mould.

A ferromagnetic core 44" is inserted into a central opening of the iron end wall 43a" and covered by the plastics layer 41". An iron flange portion 37" is provided at the lower side of the electromagnetic coil 38" and is engaged with a shoulder face 47" of the iron jacket 43". A pole tube 42" is seated within an annular recess 42a" of the iron flange portion 37". The pole tube 42" is sealingly connected to the iron flange portion 37" and to the ferromagnetic core 44". The armature A" is guided within the pole tube 42". The pole tube 42" is made of nonmagnetic material so that the magnetic field lines are deflected by the lower end of the pole tube 42". The iron jacket 43", the iron end wall 43a", the ferromagnetic core 44" and the iron flange portion 37" form a ferromagnetic core arrangement which toroidally surrounds the electromagnetic coil 39".

The cover unit 71" is fastened to the side tube 18" by a sleeve-shaped extension 43c" of the iron jacket 43". This sleeve-shaped extension 43c" axially overlaps the side tube 18" by a circumferential bead 55" being embossed into a circumferential groove 49" on the radially outer face of the side tube 18". The iron jacket 43" is provided with a pretensioning flange 45". The pretensioning flange 45" offers a pretension face 53". The cover unit 71" can be pretensioned in downward direction as shown in FIG. 17 toward the container tube 10" by a pretensioning tool engaging the container tube 10", on the one hand, and the pretensioning face 53", on the other hand. Such, the iron flange portion 37" is pressed against the upper end of the valve components housing 33", the valve components housing 33" is engaged with the shoulder face 51" of the side tube 18", and the iron flange portion 37" is engaged with the shoulder face 47" of the iron jacket 43". The helical compression spring H" is compressed between the iron flange portion 37" and the valve member V", which is seated on the valve seat S".

While maintaining this pretension of the cover unit 71" against the side tube 18", the bead 55" is rolled or caulked into the circumferential groove 49" of the side tube 18" so that after removing the pretensioning tool an internal pretension is maintained. A sealing ring 76" is, therefore, maintained in sealing engagement with the valve components housing 33", the iron flange portion 37" and the side tube 18". Such, the compartment C" confined by the side tube 18" and the cover unit 71" is sealed against atmosphere. All components of the valve unit 3" are positioned with respect to each other, and the helical compression spring H" as well as the helical compression spring G" and further springs are biased to the desired degree.

It is to be noted that the upper end of the side tube 18" is radially engaged at 77" with the iron flange portion 37" such that when rolling or caulking the bead 55" into the groove 49", no deformation of the side tube 18" and of the iron jacket 43" can occur.

The electromagnetic coil 39" is completely separated from the liquid within the compartment C" by the iron flange portion 37". The pretension during connecting the cover unit 71" and the side tube 18" is selected such that no play can occur.

It will be appreciated from the disclosure heretofore that the present invention, in at least one aspect thereof, can generally relate to a shock absorber having a piston, which piston is equipped with damping valves and is fastened to a piston rod. The piston divides the work cylinder into two work chambers filled with damping medium, whereby, parallel to the damping valves there is a bypass connecting the work chambers. The bypass is constituted by a longitudinal hole and a transverse hole in the piston rod located above the piston. There is an axially-movable control rod in the cavity of the piston rod.

German Patent No. 3 940 290 discloses a shock absorber in which the piston is fastened to a piston rod and is equipped with damping valves. The two work chambers are connected by a bypass parallel to the damping valves, whereby there is a transverse hole in the piston rod above the piston, and the piston rod has a longitudinal hole, the passage cross section of which is actuated by a pilot valve, possibly even a relay valve or a spool valve. One disadvantage of such a configuration is that a drive device is located inside the piston rod and inside the shock absorber, and therefore has to contend with specified space requirements. A further disadvantage is that the seal of the pilot valve on its circumferential surfaces creates problems and causes a large amount of friction if the tolerances are too tight.

German Laid Open Patent Appln. No. 3 535 287, and German Laid Open Patent Appln. No. 3 830 343 disclose shock absorbers with bypass connections, in which the bypass is located outside the work cylinder, and a corresponding drive device is attached laterally to the outer tube of the shock absorber.

Thus, it is also an object of the invention to create a shock absorber with an adjustable damping force, in which there is a simple, reliable system for the continuous adjustment of damping forces on shock absorbers, in particular small shock absorbers, as well as easy adaptability of different adjustment devices to a shock absorber model, whereby moving the adjustment device outside the shock absorber also achieves the smallest possible shock absorber dimensions.

The invention teaches that this object can be achieved if the control rod is actuated by a drive device, and can form, together with the longitudinal hole, a seat valve.

One advantage of this solution is that the adjustment of the damping force can be achieved by changing the cross section of the control rod together with the longitudinal hole, whereby the control rod extends outwardly through the piston rod, and whereby the control rod causes an immediate modification of the bypass cross section preferably when the control rod is displaced axially. The control rod can preferably be displaced by a mechanical, electrical, hydraulic or pneumatic adjustment unit adapted to the piston rod. One advantage of this solution is that there can be a simple design of shock absorber and drive device, as well as a simple system separation, or systematic separation, between the drive device and the bypass valve. As a result of this system separation, or systematic separation, simple adaptations to different drive devices are possible.

In one preferred configuration, the end of the control rod facing the longitudinal hole is designed so that it is conical.

Further, in one favorable embodiment, the drive device for the piston rod is preferably located outside the work cylinder.

To drive the drive device there is preferably a motor, whereby the motor can advantageously be an electric motor.

In an additional embodiment, there can preferably be a tripping element or actuating device between a drive shaft of the motor and the control rod. The tripping element can preferably be a threaded spindle, and the drive shaft and threaded spindle can preferably be advantageously connected to one another. One advantage of this arrangement is that after the motor is turned on, the rotation of the drive shaft of the motor is converted by the threaded spindle into a translation movement. As a result of a sufficient automatic interlocking of the screw thread of the threaded spindle, the specified damping force of the shock absorber can be set without the need for any additional input of energy.

The invention also teaches that the threaded spindle can preferably be located in a housing by means of a screw thread. One advantage of this arrangement is that the threaded spindle can convert the rotation of the drive shaft into an axial movement, preferably with the aid of the screw thread.

In an additional configuration, the threaded spindle is actuated by means of a transmission, whereby the transmission can advantageously consist of at least two gear wheels located between the threaded spindle and the drive shaft.

An additional feature of the invention, in accordance with a preferred embodiment thereof, is that the tripping element can preferably be a cam, so that during the rotation by the drive shaft, there can be an axial motion toward the control rod.

In an additional favorable embodiment of the invention, there can preferably be a lever between the control rod and the threaded spindle. One advantage of this configuration is that the drive device and the damping force adjustment device can be oriented axially parallel to one another, so that the axial movement of the threaded spindle can preferably be converted into an axial movement of the control rod by means of the lever.

In one advantageous embodiment, the movement of the lever in either direction can be power-assisted if the lever is actuated by a spring in at least one direction of movement.

To achieve a simple drive device, the invention teaches that there can be a manual activation apparatus.

Thus, in summary, this aspect of the present invention generally includes a shock absorber consisting of a piston rod and a piston with damping valves, whereby parallel to the damping valves of the piston there is a bypass connecting the work chambers, and in the cavity of the piston rod there is an axially movable control rod to modify the cross section of the bypass. To create a simple and economical bypass adjustment device and a simple, easily interchangeable or adaptable adjustment device, the invention teaches that the control rod is actuated by a drive device, and with the longitudinal hole forms a seat valve.

One feature of the invention resides broadly in the pneumatic, hydraulic or hydropneumatic adjustment device with a tubular container under pressure, which is divided into two work chambers by a piston fastened to a piston rod, whereby there is a locking device which can be tripped by means of a tripping tappet which runs longitudinally in the piston rod and is extended outward, characterized by the fact that the tripping tappet 2' is actuated by means of a motor 8', whereby there is a tripping element 6' between the drive shaft 7' of the motor 8' and the tripping tappet 2'.

Another feature of the invention resides broadly in the adjustment device, characterized by the fact that the motor 8' is an electric motor.

Still another feature of the invention resides broadly in the adjustment device, characterized by the fact that the tripping element 6' is a threaded spindle 6a'.

Yet another feature of the invention resides broadly in the adjustment device, characterized by the fact that the drive shaft 7' and the threaded spindle 6a are connected to one another so that they are torsionally stationary in relation to one another.

Still yet another feature of the invention resides broadly in the adjustment device, characterized by the fact that the threaded spindle 6a' is located by means of a screw thread 13' in a housing 12'.

Yet still another feature of the invention resides broadly in the adjustment device, characterized by the fact that the threaded spindle 6a' is actuated by means of a transmission 10'.

Still another feature of the invention resides broadly in the adjustment device, characterized by the fact that the transmission 10' consists of at least two gear wheels between the threaded spindle 6a' and the drive shaft 7'.

Yet another feature of the invention resides broadly in the adjustment device, characterized by the fact that the tripping element 6' is in the form of a cam 6b'.

Still yet another feature of the invention resides broadly in the adjustment device, characterized by the fact that a lever 4' is located between the tripping pin 2' and the threaded spindle 6a'.

Yet still another feature of the invention resides broadly in the adjustment device, characterized by the fact that the lever 4' can be actuated in at least one direction of movement by means of a spring 9'.

Still yet another feature of the invention resides broadly in the adjustment device, characterized by the fact that the motor 8' is controlled by means of a suitable electronic system.

Yet another feature of the invention resides broadly in the shock absorber with adjustable damping force, with a piston which is fastened to a piston rod, is equipped with damping valves and divides the work cylinder into two work chambers filled with damping medium, whereby parallel to the damping valves there is a bypass connecting the work chambers, consisting of a longitudinal hole and a transverse hole in the piston rod located above the piston, and whereby there is an axially movable control rod in the cavity of the piston rod, characterized by the fact that the control rod 9 is actuated by a drive device and with the longitudinal hole 8a forms a seat valve.

Another feature of the invention resides broadly in the shock absorber, characterized by the fact that the end of the control rod 9 facing the longitudinal hole 8a is conical.

Yet another feature of the invention resides broadly in the shock absorber, characterized by the fact that the drive device for the control rod 9 is located outside the work cylinder 1.

Still another feature of the invention resides broadly in the shock absorber, characterized by the fact that the drive device is a motor 11.

Still yet another feature of the invention resides broadly in the shock absorber, characterized by the fact that the motor 11 is an electric motor.

Another feature of the invention resides broadly in the shock absorber, characterized by the fact that there is a tripping element 12 located between a drive shaft 14 of the motor 11 and the control rod 9.

Still another feature of the invention resides broadly in the shock absorber, characterized by the fact that the tripping element 12 is a threaded spindle 13.

Yet another feature of the invention resides broadly in the shock absorber, characterized by the fact that the drive shaft 14 and the threaded spindle 13 are connected to one another so that they are torsionally stationary in relation to one another.

Still yet another feature of the invention resides broadly in the shock absorber, characterized by the fact that the threaded spindle 13 is located by means of a screw thread 21 in a housing 15.

Another feature of the invention resides broadly in the shock absorber, characterized by the fact that the threaded spindle 13 is actuated by means of a transmission 16.

Still another feature of the invention resides broadly in the shock absorber, characterized by the fact that the transmission 16 consists of at least two gear wheels between the threaded spindle 13 and the drive shaft.

Yet another feature of the invention resides broadly in the shock absorber, characterized by the fact that the tripping element 12 is a cam 17.

Still yet another feature of the invention resides broadly in the shock absorber, characterized by the fact that between the control rod 9 and the threaded spindle 13 there is a lever 18.

Another feature of the invention resides broadly in the shock absorber, characterized by the fact that the lever 18 is actuated in at least one direction of movement by a spring 19.

Yet another feature of the invention resides broadly in the shock absorber, characterized by the fact that the drive device is a manual activation apparatus 20.

Examples of shock absorber assemblies and components associated therewith, including damping valves in pistons of shock absorbers, which may be utilized in accordance with the embodiments of the present invention, may be found in the following U.S. patents: U.S. Pat. No. 4,986,393, which issued to Preukschat et al. on Jan. 22, 1991; U.S. Pat. No. 4,749,070, which issued to Moser et al. on Jun. 7, 1988; and U.S. Pat. No. 4,723,640, which issued to Beck on Feb. 9, 1988.

Examples of devices, such as chairs, which the present invention may be utilized with are disclosed in the following U.S. patents: U.S. Pat. No. 5,121,968 to Eppler on Jun. 16, 1992, entitled "Chair, Particularly Office Chair"; U.S. Pat. No. 4,832,402 to Zund on May 23, 1989, entitled "Adjusting Mechanism for a Chair"; U.S. Pat. No. 4,779,925 to Heinzel on Oct. 25, 1988, entitled "Height-adjustable Swivel Chair Equipped with Gas Pressure Spring, Especially Office Chair or Office Armchair"; U.S. Pat. No. 4,557,470 to Link on Dec. 10, 1985, entitled "Gas Pressure Spring with a Safety Device"; U.S. Pat. No. 5,097,928 to Enders et al. on Mar. 24, 1992, entitled "Positioning Device"; and U.S. Pat. No. 5,090,770 to Heinrich et al. on Feb. 25, 1992, entitled "Electrical Seat Adjustment Device".

Examples of devices, such as backrests and footrests on chairs, which the present invention may be utilized with are disclosed in the following U.S. patents: U.S. Pat. No. 4,471,994 to Zund et al. on Sep. 18, 1984, entitled "Adjustable Chair"; and U.S. Pat. No. 4,456,244 to Andrews on Jun. 26, 1984, entitled "Swing Propelling Footrest".

Examples of devices, such as steering columns, which the present invention may be utilized with are disclosed in the following U.S. patents: U.S. Pat. No. 5,213,004 to Hoblingre on May 25, 1993, entitled "Device for Locking in Position the Adjustable Steering Column of a Motor Vehicle"; U.S. Pat. No. 5,110,233 to Hoblingre et al. on May 5, 1992, entitled "Device for Temporarily Axially Immobilizing a Shaft in a Body Such as a Steering Column Casing Tube"; and U.S. Pat. No. 5,029,489 to Burmeister et al. on Jul. 9, 1991, entitled "Steering Column with Vertically Adjustable Steering Wheel for Motor Vehicles".

Examples of electronic control systems which the present invention may be utilized with are disclosed in the following U.S. patents: U.S. Pat. No. 4,702,307 to Ito et al. on Oct. 27, 1987, entitled "Air Conditioner Control System"; and U.S. Pat. No. 4,667,480 to Bessler on May 26, 1987, entitled "Method and Apparatus for Controlling an Electrically Driven Automotive Air Conditioner".

An example of an electronic transmission which the present invention may be utilized with is disclosed in the following U.S. patent: U.S. Pat. No. 4,962,680 to Kirstein on Oct. 16, 1990, entitled "Electronic Control Device for a Drive System".

Examples of control keyboards which the present invention may be utilized with are disclosed in the following U.S. patents: U.S. Pat. No. 5,220,323 to Ito et al. on Jun. 15, 1993, entitled "Keyboard Apparatus Having Ghost Key Sensing Function"; and U.S. Pat. No. 5,138,945 to Lee et al. on Aug. 18, 1992, entitled "System for Removing Foreign Matter from a Plate Cylinder of a Printing Press".

Examples of shock absorber assemblies which may be utilized in accordance with the present invention may be disclosed in the following U.S. patents: U.S. Pat. No. 4,838,393 to Mourray et al. on Jun. 13, 1989, entitled "Hydro-mechanical Stop Having a Restrictive Passage"; U.S. Pat. No. 4,817,928, to Paton on Apr. 4, 1989, entitled "Suspension System"; U.S. Pat. No. 4,527,674 to Mourray on Jul. 9, 1985, entitled "Shock Absorber With a Hydromechanical Stop"; and U.S. Pat. No. 4,749,069 to Knecht et al. on Jun. 7, 1988, entitled "Vibration Damper for Motor Vehicles Having an Arrangement for Varying Damping Thereof".

All, or substantially all, of the components and methods of the various embodiments may be used with at least one embodiment or all of the embodiments, if any, described herein.

All of the U.S. patents patent applications and publications recited herein and in the Declaration attached hereto are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. An adjustment device in combination with a tubular body, said tubular body comprising:

a piston movably disposed within said tubular body;

said piston dividing said tubular body into a first chamber and a second chamber;

fluid under pressure being disposed in said first chamber and said second chamber;

a piston rod connected to said piston, said piston rod having a longitudinal dimension;

said piston rod having a longitudinal bore extending along the longitudinal dimension of said piston rod;

said adjustment device comprising:

means for restricting at least one motion of said piston within said tubular body restricting flow of fluid under pressure between said first chamber and said second chamber;

said restricting means comprising an inner disposed within said longitudinal bore of said piston rod to restrict flow of fluid under pressure between said first chamber and said second chamber;

motor means;

means for transferring motion from said motor means to said inner rod to move said inner rod along the longitudinal dimension of said piston rod to restrict flow of fluid under pressure between said first chamber and said second chamber, thus modifying said at least one motion of said piston within said tubular body; said inner rod being movable along with said piston rod; said restricting means further comprising:

means for conducting fluid between said first chamber and said second chamber, said means for conducting fluid being disposed within said tubular body;

said means for conducting fluid comprising a portion of said longitudinal bore;

said inner rod being disposed to vary conduction of fluid in said means for conducting fluid, to modify said at least one motion of said piston within said tubular body;

the fluid in said first chamber and said second chamber being under a greater pressure than ambient pressure;

said means for conducting fluid comprising at least one orifice;

said inner rod being disposed to vary conduction of fluid through said at least one orifice;

said at least one orifice having walls disposed thereabout, at least a portion of said walls forming a valve seat;

said inner rod comprising valve means for at least partially opening and closing said valve seat by moving towards and away from said valve seat of said at least one orifice;

said motor means having means for transmitting a rotational driving force to said means for transferring motion;

said means for transferring motion comprising means for translating the rotational driving force of said motor means into a linear driving force, to move said inner rod with respect to said means for conducting fluid, to vary conduction of fluid in said means for conducting fluid;

said means for translating comprising:

a housing portion disposed adjacent said tubular body, said housing portion comprising internal threads;

a spindle, said spindle for translating rotational movement of said motor means to linear movement;

said spindle comprising external threads; and said internal threads of said housing portion and said external threads of said spindle being engaged with one another to permit said spindle to move linearly within said housing portion.

2. The adjustment device according to claim 1 wherein means for translating further comprising means for displacing said inner rod within means for conducting fluid, said displacing means comprising a lever and spring means for biasing said lever in at least one direction of movement for executing a motion to displace said inner rod; and said lever being operatively associated with said spindle.

3. The adjustment device according to claim 2 wherein:

said piston comprises additional means for conducting fluid between said first chamber and said second chamber;

said longitudinal bore has a diameter;

said longitudinal bore has a first end and a second end, said first end being disposed adjacent said means for transferring motion and said second end being disposed adjacent said valve seat of said at least one orifice;

said inner rod comprises:
- a first portion, a second portion, and a third portion;
- said first portion of said inner rod is disposed adjacent said means for transferring motion;
- said first portion of said inner rod has a first diameter;
- said second portion of said inner rod extends from said first portion of said inner rod;
- said second portion of said inner rod has a second diameter;
- said second diameter is larger than said first diameter;
- said third portion of said inner rod extends from said second portion of said inner rod and is disposed adjacent said valve seat of said at least one orifice;
- said third portion of said inner rod comprises said valve means;
- said third portion of said inner rod has a diameter;
- said diameter of said third portion is less than said diameter of said second portion and less than the diameter of said longitudinal bore;
- said at least one orifice is a single orifice;
- said single orifice has a diameter, the diameter of said single orifice being less than the diameter of said longitudinal bore;
- said single orifice extends substantially from said second end of said longitudinal bore to said second chamber;
- said means for conducting fluid further comprises an additional orifice;
- said additional orifice is disposed radially within said piston rod to provide fluid communication between said first chamber and said second chamber;
- said additional orifice extends between said longitudinal bore and said first chamber;

said means for transmitting of said motor means comprises:
- a drive shaft for transmitting rotational movement to said means for translating, said drive shaft being connected with said spindle in a torsionally stationary manner with respect to said spindle;

said inner rod extends outwardly from said piston rod;

said motor means comprises an electric motor;

said motor means is controlled by electronic control means;

said adjustment device further comprises:
- a transmission arrangement connected between said electric motor and said drive shaft to regulate the rotational speed of said drive shaft with respect to the rotational speed of said motor;

said lever is disposed between said inner rod and said spindle;

said spindle further comprises a thrust washer disposed between said lever and said spindle;

said lever comprises:
- a first portion and a second portion;
- said first portion is disposed adjacent said spindle;
- said second portion is disposed adjacent said inner rod;
- fulcrum means disposed between said first portion of said lever and said second portion of said lever;
- said first portion of said lever has a first length extending from said fulcrum means to said thrust washer;
- said second portion of said lever has a second length extending from said fulcrum means to said inner rod; and said first length is at least three times greater than said second length.

4. The adjustment device according to claim 1 wherein said means for translating further comprises means for displacing said inner rod within said means for conducting fluid, said displacing means comprising at least one gear wheel for executing a motion to be translated into a displacement of said inner rod; and said at least one gear wheel being operatively associated with said spindle.

5. The adjustment device according to claim 4 wherein:

said piston comprises additional means for conducting fluid between said first chamber and said second chamber;

said longitudinal bore has a diameter;

said longitudinal bore has a first end and a second end, said first end being disposed adjacent said means for transferring motion and said second end being disposed adjacent said valve seat of said at least one orifice;

said inner rod comprises:
- a first portion, a second portion, and a third portion;
- said first portion of said inner rod is disposed adjacent said means for transferring motion;
- said first portion of said inner rod has a first diameter;
- said second portion of said inner rod extends from said first portion of said inner rod;
- said second portion of said inner rod has a second diameter;
- said second diameter is larger than said first diameter;
- said third portion of said inner rod extends from said second portion of said inner rod and is disposed adjacent said valve seat of said at least one orifice;
- said third portion of said inner rod comprises said valve means;
- said third portion of said inner rod has a diameter;
- said diameter of said third portion is less than said diameter of said second portion and less than the diameter of said longitudinal bore;
- said at least one orifice is a single orifice;
- said single orifice has a diameter, the diameter of said single orifice being less than the diameter of said longitudinal bore;
- said single orifice extends substantially from said second end of said longitudinal bore to said second chamber;
- said means for conducting fluid further comprises an additional orifice;
- said additional orifice is disposed radially within said piston rod to provide fluid communication between said first chamber and said second chamber;
- said additional orifice extends between said longitudinal bore and said first chamber;

said means for transmitting of said motor means comprises a drive shaft for transmitting rotational movement to said means for translating, said drive shaft being connected with said spindle in a torsionally stationary manner with respect to said spindle;

said inner rod extends outwardly from said piston rod;

said motor means comprises an electric motor;

said motor means is controlled by electronic control means;

said adjustment device further comprises:
- a transmission arrangement connected between said electric motor and said drive shaft to regulate the rotational speed of said drive shaft with respect to the rotational speed of said motor;

said at least one gear wheel comprises two gear wheels, a first of said gear wheels being meshed with a second of said gear wheels; and said two gear wheels being configured for translating a rotational driving force provided by said motor means into a linear force for displacing said inner rod.

6. A method of making and operating an adjustment device in combination with a tubular body, the tubular body comprising: a piston movably disposed within the tubular body; the piston dividing the tubular body into a first chamber and a second chamber; fluid under pressure being disposed in the first chamber and the second chamber; a piston rod connected to the piston, the piston rod having a longitudinal dimension; the piston rod having a longitudinal bore extending along the longitudinal dimension of the piston rod; the adjustment device comprising: means for restricting at least one motion of the piston within the tubular body by restricting flow of fluid under pressure between the first chamber and the second chamber; the restricting means comprising an inner rod disposed within the longitudinal bore of the piston rod to restrict flow of fluid under pressure between the first chamber and the second chamber; motor means; and means for transferring motion from the motor means to the inner rod to move the inner rod along the longitudinal dimension of the piston rod to restrict flow of fluid under pressure between the first chamber and the second chamber, thus modifying the at least one motion of the piston within the tubular body; said method comprising the steps of:

providing an adjustment device;

providing a tubular body;

said providing of the tubular body further comprising:
 providing a piston;
 movably disposing the piston within the tubular body such that the tubular body is divided into a first chamber and a second chamber;
 disposing fluid under pressure in the first chamber and the second chamber;
 providing a piston rod, the piston rod having a longitudinal dimension and a longitudinal bore extending along the longitudinal dimension of the piston rod;
 connecting the piston rod to the piston;

said providing of the adjustment device further comprising:
 providing restricting means;

with the restricting means, restricting at least one motion of the piston within the tubular body by restricting flow of fluid under pressure between the first chamber and the second chamber;
 said providing of the restricting means further comprising:
  providing an inner rod;
  disposing the inner rod within the longitudinal bore of the piston rod;

said providing of the adjustment means further comprising:
 providing motor means;
 providing means for transferring motion from the motor means to the inner rod;
 transferring motion from the motor means to the inner rod, with the means for transferring motion, and moving the inner rod along the longitudinal dimension of the piston rod thus modifying the at least one motion of the piston within the tubular body;
 moving the inner rod along the longitudinal dimension of the piston rod to restrict flow of fluid under pressure between the first chamber and the second chamber, and to modify flow characteristics between the first and second chambers;

configuring the inner rod to move with the piston rod;

moving the inner rod with the piston rod;

said providing of the restricting means further comprising:
 providing means for conducting fluid between the first chamber and the second chamber, the means for conducting fluid comprising a portion of the longitudinal bore;

disposing the means for conducting fluid within the tubular body;

disposing the inner rod so as to be able to vary conduction of fluid within the means for conducting fluid;

varying conduction of fluid in the means for conducting fluid with the inner rod, and modifying the at least one motion of the piston within the tubular body;

pressurizing the fluid in the first chamber and the second chamber to a greater pressure than ambient pressure;

said providing of the means for conducting fluid further comprising:
 providing at least one orifice;

varying the conduction of fluid through the at least one orifice with the inner rod;

said providing of the at least one orifice further comprising:
 providing the at least one orifice with walls disposed thereabout;
 forming a valve seat with the walls of the at least one orifice;

said providing of the inner rod further comprising:
 providing valve means for at least partially opening and closing the valve seat;
 moving the valve means towards and away from the valve seat of the at least one orifice to at least partially open and close the valve seat;

said providing of the motor means further comprising providing means for transmitting a rotational driving force to the means for transferring motion;

said providing of the means for transferring motion comprising providing means for translating the rotational driving force of the motor means into a linear driving force;

transmitting a rotational driving force to the means for transferring motion, with the means for transmitting;

translating the rotational driving force of the motor means into a linear driving force, with the means for translating;

moving the inner rod with respect to the means for conducting fluid to vary the conducting of fluid in the means for conducting fluid;

said providing of the means for translating further comprising:
 providing a housing portion;
 disposing the housing portion adjacent the tubular body;
 providing the housing portion with internal threads;
 providing a spindle having external threads;
 engaging the external threads of the spindle with the internal threads of the housing portion; and
 translating rotational movement of said motor means to linear movement by moving the spindle linearly in the housing portion.

7. The method according to claim 6 wherein:

said providing of the means for translating further comprises:
- providing means for displacing the inner rod within the means for conducting fluid;
- providing the displacing means with a lever and spring means, the lever being operatively associated with the spindle;
- displacing the inner rod within the means for conducting fluid with the lever and spring means; and
- biasing the lever in at least one direction of movement by means of the spring means to execute a motion to displace the inner rod.

8. The method according to claim 7, wherein:

said providing of the piston further comprises providing additional means for conducting fluid between said first chamber and said second chamber;

conducting fluid between the first chamber and the second chamber with the additional means for conducting fluid;

the longitudinal bore has a diameter, a first end, and a second end;

disposing the first end of the longitudinal bore adjacent the means for transferring motion and disposing the second end adjacent the valve seat of the at least one orifice;

said providing of the inner rod further comprises:
- providing a first portion, a second portion, and a third portion;
- disposing said first portion of said inner rod adjacent said means for transferring motion;
- said first portion of said inner rod has a first diameter;
- extending said second portion of said inner rod from said first portion of said inner rod;
- said second portion of said inner rod has a second diameter;
- said second diameter is larger than said first diameter;
- extending said third portion of said inner rod from the second portion of the inner rod and disposing the third portion adjacent said valve seat of said at least one orifice;
- configuring the third portion of the inner rod to comprise the valve means;
- said third portion of said inner rod has a diameter;
- said diameter of said third portion is less than said diameter of said second portion and less than the diameter of said longitudinal bore;
- the at least one orifice is a single orifice;
- the single orifice has a diameter, the diameter of the single orifice being less than the diameter of the longitudinal bore;
- extending the single orifice substantially from the second end of the longitudinal bore to the second chamber;
- said providing of the means for conducting fluid further comprises providing an additional orifice;
- disposing said additional orifice radially within said piston rod to provide fluid communication between said first chamber and said second chamber;
- extending the additional orifice between the longitudinal bore and the first chamber;

said providing of the means for transmitting of the motor means further comprises:
- providing a drive shaft for transmitting rotational movement to the means for translating;
- connecting the drive shaft with the spindle in a torsionally stationary manner with respect to the spindle;
- transmitting rotational movement to the means for translating with the drive shaft;
- extending said inner rod outwardly from said piston rod;
- configuring said motor means to comprise an electric motor;
- controlling said motor means with electronic control means;

said providing of the adjustment device further comprising:
- providing a transmission arrangement and connecting the transmission arrangement between said electric motor and said drive shaft and regulating the rotational speed of said drive shaft with respect to the rotational speed of said motor; said method further comprising:
- disposing said lever between said inner rod and said spindle;
- said providing of the spindle further comprises providing a thrust washer and disposing the thrust washer between said lever and said spindle;
- said providing of the lever further comprises:
  - providing a first portion and a second portion;
  - disposing said first portion adjacent said spindle;
  - disposing said second portion adjacent said inner rod;
  - providing fulcrum means and disposing the fulcrum means between said first portion of said lever and said second portion of said lever;
  - said first portion of said lever has a first length extending from said fulcrum means to said thrust washer;
  - said second portion of said lever has a second length extending from said fulcrum means to said inner rod; and
  - said first length is at least three times greater than said second length.

9. The method according to claim 6 wherein:

said providing of the means for translating further comprises providing means for displacing the inner rod within the means for conducting fluid;

said providing of the means for displacing further comprises providing at least one gear wheel for executing a motion to be translated into a displacement of the inner rod, the at least one gear wheel being operatively associated with the spindle;

executing a motion with the at least one gear wheel and displacing the inner rod within the means for conducting fluid;

said providing of the piston further comprises providing additional means for conducting fluid between said first chamber and said second chamber;

conducting fluid between the first chamber and the second chamber with the additional means for conducting fluid;

said longitudinal bore has a diameter, a first end and a second end;

disposing the first end adjacent said means for transferring motion and disposing said second end adjacent said valve seat of said at least one orifice;

said providing of the inner rod further comprises:
- providing a first portion, a second portion, and a third portion;
- disposing said first portion of said inner rod adjacent said means for transferring motion;
- said first portion of said inner rod has a first diameter;

extending said second portion of said inner rod from said first portion of said inner rod;

said second portion of said inner rod has a second diameter;

said second diameter is larger than said first diameter;

extending said third portion of said inner rod from said second portion of said inner rod and disposing the third portion adjacent said valve seat of said at least one orifice;

configuring said third portion of said inner rod to comprise said valve means;

said third portion of said inner rod has a diameter;

said diameter of said third portion is less than said diameter of said second portion and less than the diameter of said longitudinal bore;

said at least one orifice is a single orifice;

said single orifice has a diameter, the diameter of said single orifice being less than the diameter of said longitudinal bore;

extending said single orifice substantially from said second end of said longitudinal bore to said second chamber;

said providing of the means for conducting fluid further comprises providing an additional orifice;

disposing said additional orifice radially within said piston rod to provide fluid communication between said first chamber and said second chamber;

extending said additional orifice between said longitudinal bore and said first chamber;

said providing of the means for transmitting of said motor means further comprises:

providing a drive shaft for transmitting rotational movement to said means for translating;

connecting said drive shaft with said spindle in a torsionally stationary manner with respect to said spindle;

extending said inner rod outwardly from said piston rod;

said providing of the motor means comprises providing an electric motor;

controlling said motor means with electronic control means;

said providing of the adjustment device further comprising:

providing a transmission arrangement and connecting the transmission arrangement between said electric motor and said drive shaft and regulating the rotational speed of said drive shaft with respect to the rotational speed of said motor;

said providing of the at least one gear wheel comprises providing two gear wheels;

meshing a first of said gear wheels with a second of said gear wheels; and configuring said two gear wheels for translating a rotational driving force provided by said motor means into a linear force for displacing said inner rod; and translating a rotational driving force provided by the motor means into a linear force for displacing the inner rod, with the two gear wheels.

10. An adjustment device in combination with a tubular body, said tubular body comprising:

a piston movably disposed within said tubular body;

said piston dividing said tubular body into a first chamber and a second chamber;

fluid under pressure being disposed in said first chamber and said second chamber;

a piston rod connected to said piston, said piston rod having a longitudinal dimension;

said piston rod having a longitudinal bore extending along the longitudinal dimension of said piston rod;

said adjustment device comprising:

means for restricting at least one motion of said piston within said tubular body by restricting flow of fluid under pressure between said first chamber and said second chamber;

said restricting means comprising an inner rod disposed within said longitudinal bore of said piston rod to restrict flow of fluid under pressure between said first chamber and said second chamber;

motor means;

means for transferring motion from said motor means to said inner rod to move said inner rod along the longitudinal dimension of said piston rod to restrict flow of fluid under pressure between said first chamber and said second chamber, thus modifying said at least one motion of said piston within said tubular body;

said inner rod being movable along with said piston rod;

said restricting means further comprising:

means for conducting fluid between said first chamber and said second chamber, said means for conducting fluid being disposed within said tubular body;

said means for conducting fluid comprising a portion of said longitudinal bore;

said inner rod being disposed to vary conduction of fluid in said means for conducting fluid, to modify said at least one motion of said piston within said tubular body;

the fluid in said first chamber and said second chamber being under a greater pressure than ambient pressure;

said means for conducting fluid comprising at least one orifice;

said inner rod being disposed to vary conduction of fluid through said at least one orifice;

said at least one orifice having walls disposed thereabout, at least a portion of said walls forming a valve seat;

said inner rod comprising valve means for at least partially opening and closing said valve seat by moving towards and away from said valve seat of said at least one orifice;

said motor means having means for transmitting a rotational driving force to said means for transferring motion;

said means for transferring motion comprising means for translating the rotational driving force of said motor means into a linear driving force, to move said inner rod with respect to said means for conducting fluid, to vary conduction of fluid in said means for conducting fluid;

said means for translating comprising a cam for executing a motion to displace said inner rod.

11. The adjustment device according to claim 10 wherein:

said piston comprises additional means for conducting fluid between said first chamber and said second chamber;

said longitudinal bore has a diameter;

said longitudinal bore has a first end and a second end, said first end being disposed adjacent said means for transferring motion and said second end being disposed adjacent said valve seat of said at least one orifice;

said inner rod comprises:
a first portion, a second portion, and a third portion;
said first portion of said inner rod is disposed adjacent said means for transferring motion;
said first portion of said inner rod has a first diameter;
said second portion of said inner rod extends from said first portion of said inner rod;
said second portion of said inner rod has a second diameter;
said second diameter is larger than said first diameter;
said third portion of said inner rod extends from said second portion of said inner rod and is disposed adjacent said valve seat of said at least one orifice;
said third portion of said inner rod comprises said valve means;
said third portion of said inner rod has a diameter;
said diameter of said third portion is less than said diameter of said second portion and less than the diameter of said longitudinal bore;
said at least one orifice is a single orifice;
said single orifice has a diameter, the diameter of said single orifice being less than the diameter of said longitudinal bore;
said single orifice extends substantially from said second end of said longitudinal bore to said second chamber;
said means for conducting fluid further comprises an additional orifice;
said additional orifice is disposed radially within said piston rod to provide fluid communication between said first chamber and said second chamber;
said additional orifice extends substantially between said longitudinal bore and said first chamber;

said means for transmitting of said motor means comprises a drive shaft for transmitting rotational movement to said means for translating, said drive shaft being operatively connected to said cam for transmitting rotational movement to said cam;

said inner rod extends outwardly from said piston rod;

said motor means comprises an electric motor;

said motor means is controlled by electronic control means;

said adjustment device further comprises a transmission arrangement connected between said electric motor and said drive shaft to regulate the rotational speed of said drive shaft with respect to the rotational speed of said motor; and said cam comprises a cam surface, wherein said inner rod is disposed adjacent said cam surface and said inner rod is configured to follow the movement of said cam surface in response to rotational movement of said cam, said cam surface being configured such that, upon rotational movement of said cam, said inner rod displaces linearly.

12. A method of making and operating an adjustment device in combination with a tubular body, the tubular body comprising: a piston movably disposed within the tubular body; the piston dividing the tubular body into a first chamber and a second chamber; fluid under pressure being disposed in the first chamber and the second chamber; a piston rod connected to the piston, the piston rod having a longitudinal dimension; the piston rod having a longitudinal bore extending along the longitudinal dimension of the piston rod; the adjustment device comprising: means for restricting at least one motion of the piston within the tubular body by restricting flow of fluid under pressure between the first chamber and the second chamber; the restricting means comprising an inner rod disposed within the longitudinal bore of the piston rod to restrict flow of fluid under pressure between the first chamber and the second chamber; motor means; and means for transferring motion from the motor means to the inner rod to move the inner rod along the longitudinal dimension of the piston rod to restrict flow of fluid under pressure between the first chamber and the second chamber, thus modifying the at least one motion of the piston within the tubular body; said method comprising the steps of:

providing an adjustment device;

providing a tubular body;

said providing of the tubular body further comprising:
providing a piston;
movably disposing the piston within the tubular body such that the tubular body is divided into a first chamber and a second chamber;
disposing fluid under pressure in the first chamber and the second chamber;
providing a piston rod, the piston rod having a longitudinal dimension and a longitudinal bore extending along the longitudinal dimension of the piston rod;
connecting the piston rod to the piston;

said providing of the adjustment device further comprising:
providing restricting means;

with the restricting means, restricting at least one motion of the piston within the tubular body by restricting flow of fluid under pressure between the first chamber and the second chamber;

said providing of the restricting means further comprising:
providing an inner rod;
disposing the inner rod within the longitudinal bore of the piston rod;

said providing of the adjustment means further comprising:
providing motor means;
providing means for transferring motion from the motor means to the inner rod;
transferring motion from the motor means to the inner rod, with the means for transferring motion, and moving the inner rod along the longitudinal dimension of the piston rod thus modifying the at least one motion of the piston within the tubular body;
moving the inner rod along the longitudinal dimension of the piston rod to restrict flow of fluid under pressure between the first chamber and the second chamber, and to modify flow characteristics between the first and second chambers;

configuring the inner rod to move with the piston rod;

moving the inner rod with the piston rod;

said providing of the restricting means further comprising:
providing means for conducting fluid between the first chamber and the second chamber, the means for conducting fluid comprising a portion of the longitudinal bore; disposing the means for conducting fluid within the tubular body;
disposing the inner rod so as to be able to vary conduction of fluid within the means for conducting fluid;

varying conduction of fluid in the means for conducting fluid with the inner rod, and modifying the at least one motion of the piston within the tubular body;

pressurizing the fluid in the first chamber and the second chamber to a greater pressure than ambient pressure;

said providing of the means for conducting fluid further comprising:
providing at least one orifice;

varying the conduction of fluid through the at least one orifice with the inner rod;

said providing of the at least one orifice further comprising:
providing the at least one orifice with walls disposed thereabout;
forming a value seat with the walls of the at least one orifice;

said providing of the inner rod further comprising:
providing value means for at least partially opening and closing the value seat;
moving the value means towards and away from the valve seat of the at least one orifice to at least partially open and close the valve seat;

said providing of the motor means further comprising providing means for transmitting a rotational driving force to the means for transferring motion;

said providing of the means for transferring motion comprising providing means for translating the rotational driving force of the motor means into a linear driving force;

transmitting a rotational driving force to the means for transferring motion, with the means for transmitting;

translating the rotational driving force of the motor means into a linear driving force, with the means for translating;

moving the inner rod with respect to the means for conducting fluid to vary the conducting of fluid in the means for conducting fluid;

said providing of the means for translating further comprising providing a cam for executing a motion to displace the inner rod;

executing a motion, with the cam, and displacing the inner rod;

said providing of the piston further comprising providing additional means for conducting fluid between said first chamber and said second chamber;

conducting fluid between the first chamber and the second chamber with the additional means for conducting fluid;

said longitudinal bore having a diameter;

said longitudinal bore having a first end and a second end;

disposing said first end adjacent said means for transferring motion and disposing said second end adjacent said valve seat of said at least one orifice;

said providing of the inner rod further comprising:
providing a first portion, a second portion, and a third portion;
disposing said first portion of said inner rod adjacent said means for transferring motion;
said first portion of said inner rod having a first diameter;
extending said second portion of said inner rod from said first portion of said inner rod;
said second portion of said inner rod having a second diameter;
said second diameter being larger than said first diameter;
extending said third portion of said inner rod from said second portion of said inner rod and disposing the third portion adjacent said valve seat of said at least one orifice;
configuring said third portion of said inner rod to comprise said valve means;
said third portion of said inner rod having a diameter;
said diameter of said third portion being less than said diameter of said second portion and less than the diameter of said longitudinal bore;
said at least one orifice being a single orifice;
said single orifice having a diameter, the diameter of said single orifice being less than the diameter of said longitudinal bore;
extending said single orifice substantially from said second end of said longitudinal bore to said second chamber;
said providing of the means for conducting fluid further comprising providing an additional orifice;
disposing said additional orifice radially within said piston rod to provide fluid communication between said first chamber and said second chamber;
extending said additional orifice substantially between said longitudinal bore and said first chamber;

said providing of the means for transmitting of said motor means further comprising:
providing a drive shaft for transmitting rotational movement to said means for translating;
operatively connecting said drive shaft to said cam and transmitting rotational movement to said cam with the drive shaft;
extending said inner rod outwardly from said piston rod;
said providing of the motor means further comprising providing an electric motor;
controlling said motor means with electronic control means; said providing of the adjustment device further comprising:
providing a transmission arrangement and connecting the transmission arrangement between said electric motor and said drive shaft and regulating the rotational speed of said drive shaft with respect to the rotational speed of said motor;
said providing of the cam further comprising providing a cam surface;
disposing said inner rod adjacent said cam surface; and
following the movement of said cam surface, with the inner rod, in response to rotational movement of said cam, said inner rod displacing linearly upon rotational movement of the cam.

* * * * *

UNITED STATES PATENT AND TRADEMARK OFFICE
CERTIFICATE OF CORRECTION

PATENT NO. : 5,538,115
DATED : July 23, 1996
INVENTOR(S) : Klaus KOCH

It is certified that error appears in the above-indentified patent and that said Letters Patent is hereby corrected as shown below:

In column 11, line 48, after 'end', delete "18a" and insert --8a'--.

In column 24, line 1, Claim 1, after 'inner' insert --rod--.

In column 24, line 55, Claim 2, before the first occurrence of 'means' insert --said--.

Signed and Sealed this

Twenty-first Day of January, 1997

Attest:

BRUCE LEHMAN

*Attesting Officer*   *Commissioner of Patents and Trademarks*